INVENTOR
ROBERT S. KAFKA
BY *Julian C. Renfro*
ATTORNEY

May 3, 1966   R. S. KAFKA   3,248,981
REMOTE CONTROLLED ARTICLE SELECTOR AND DISPENSER
Original Filed May 7, 1962   14 Sheets-Sheet 3

INVENTOR
ROBERT S. KAFKA
BY *Julian C. Renfro*
ATTORNEY

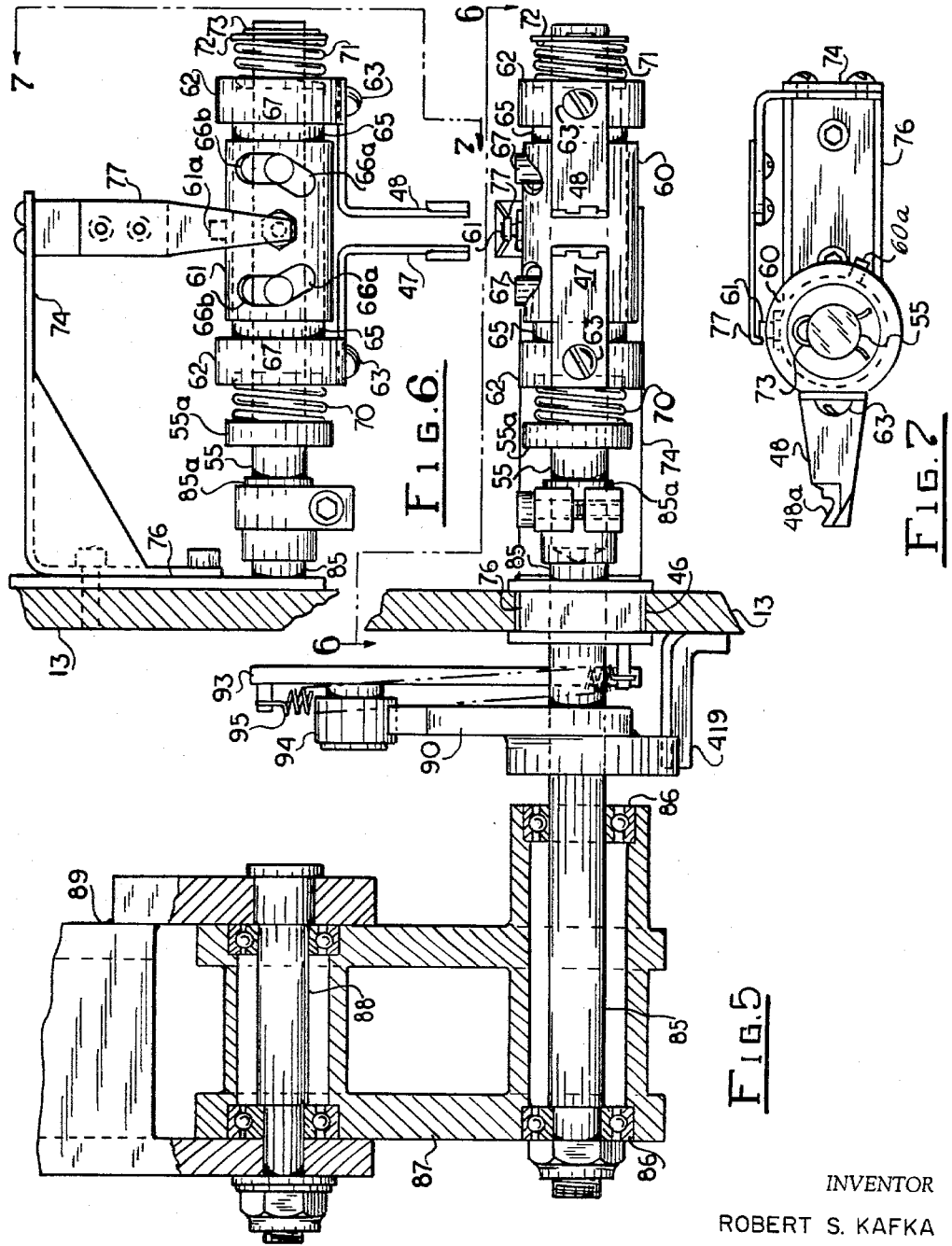

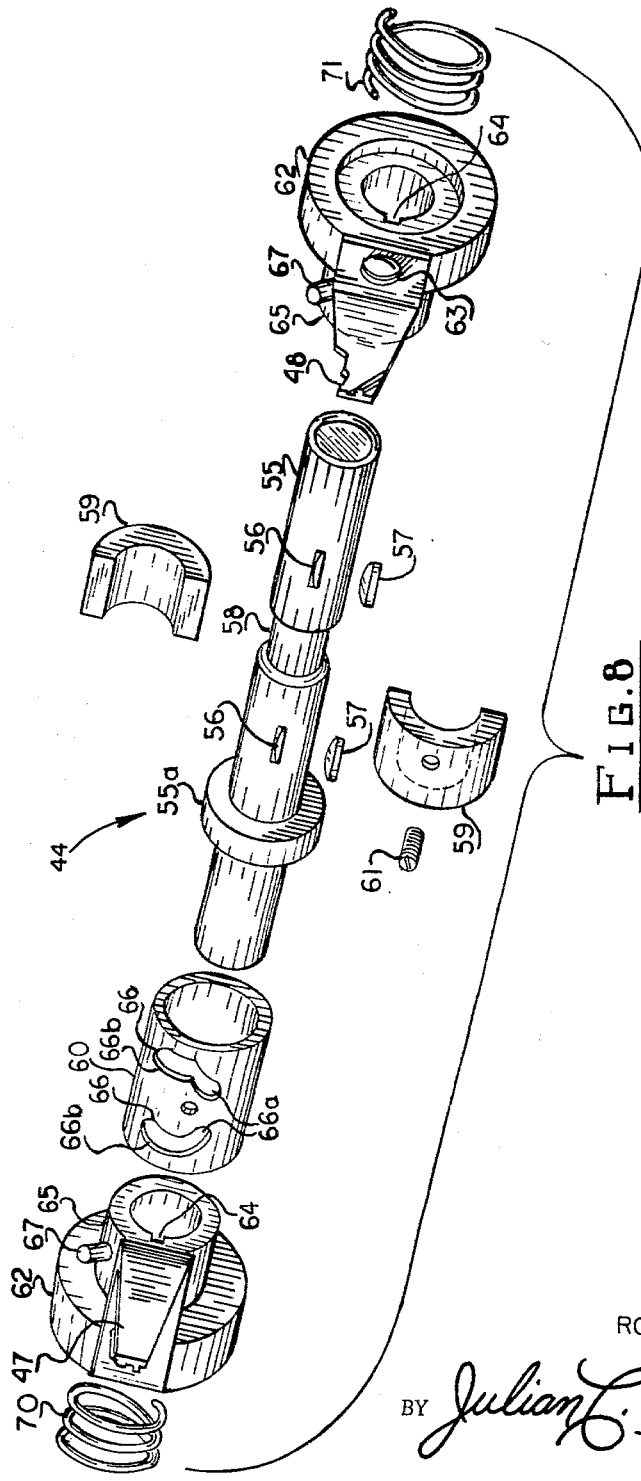

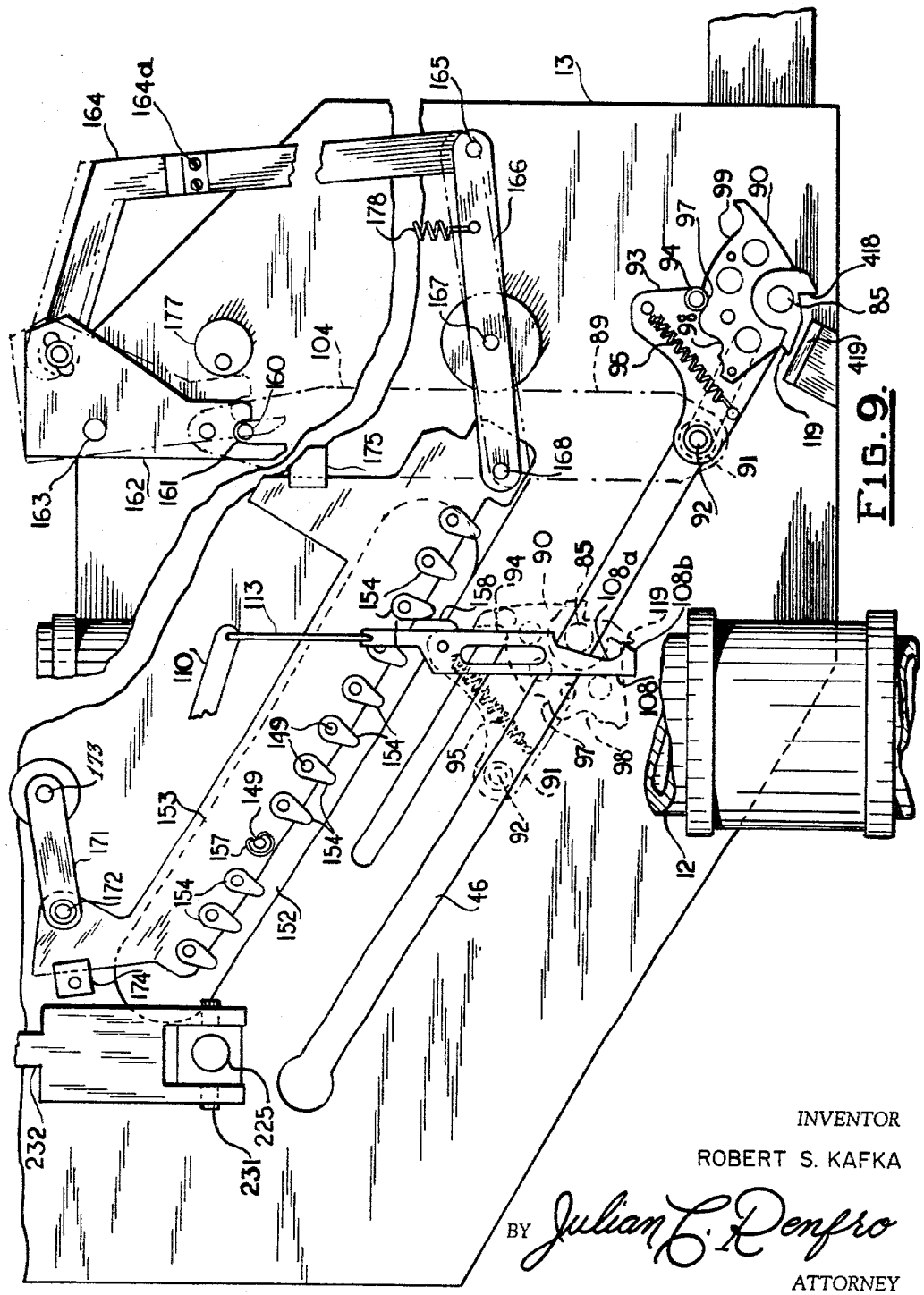

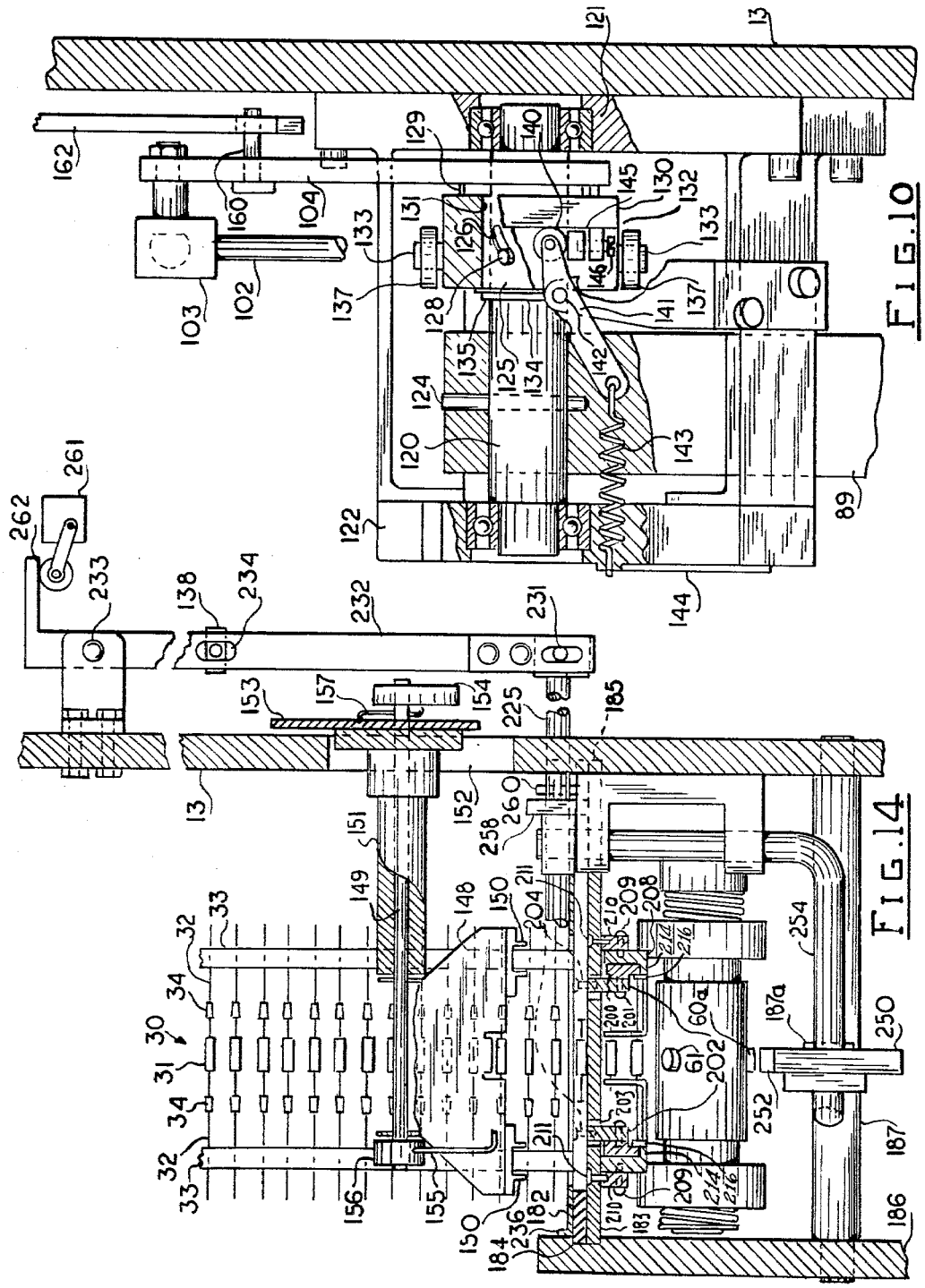

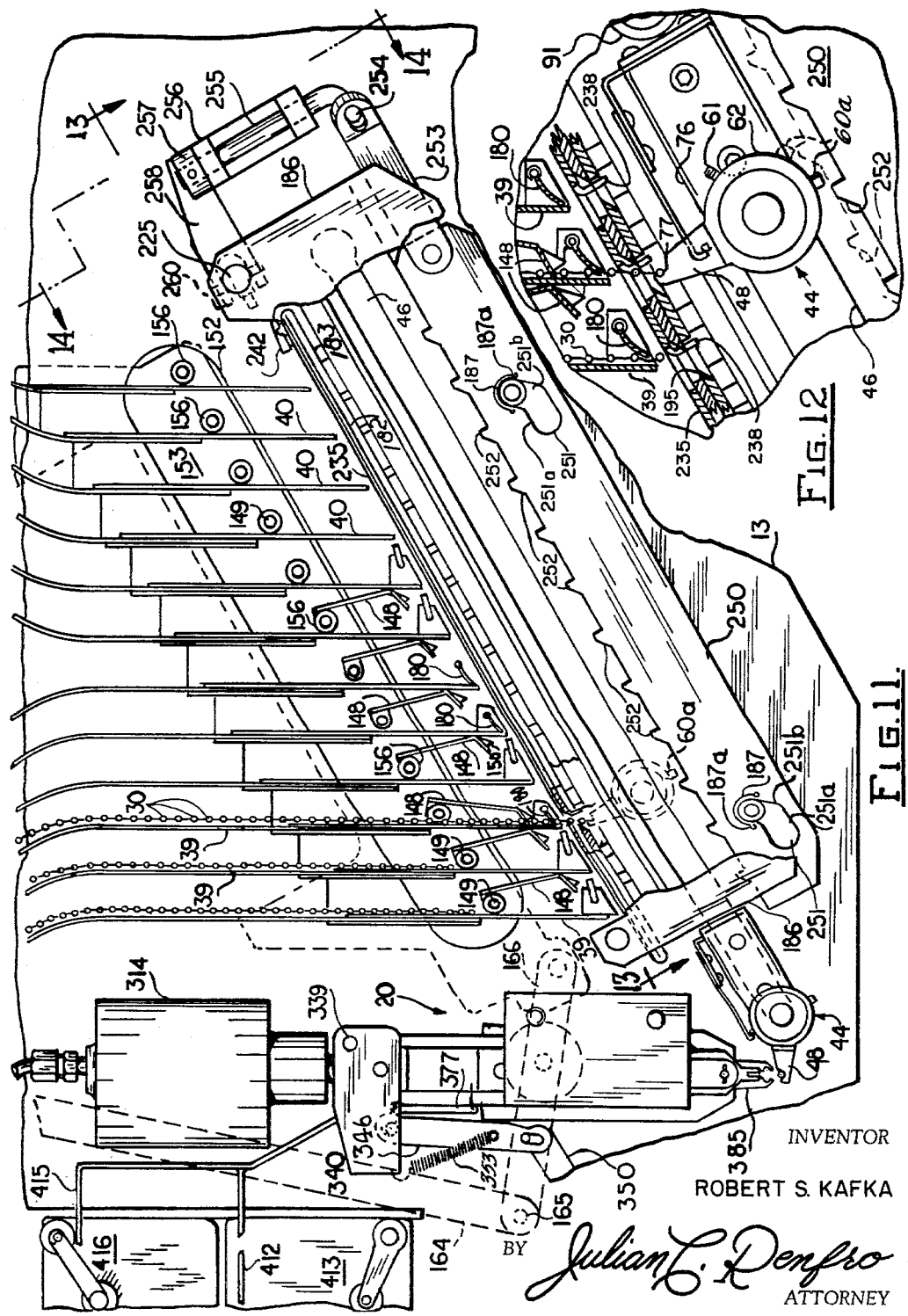

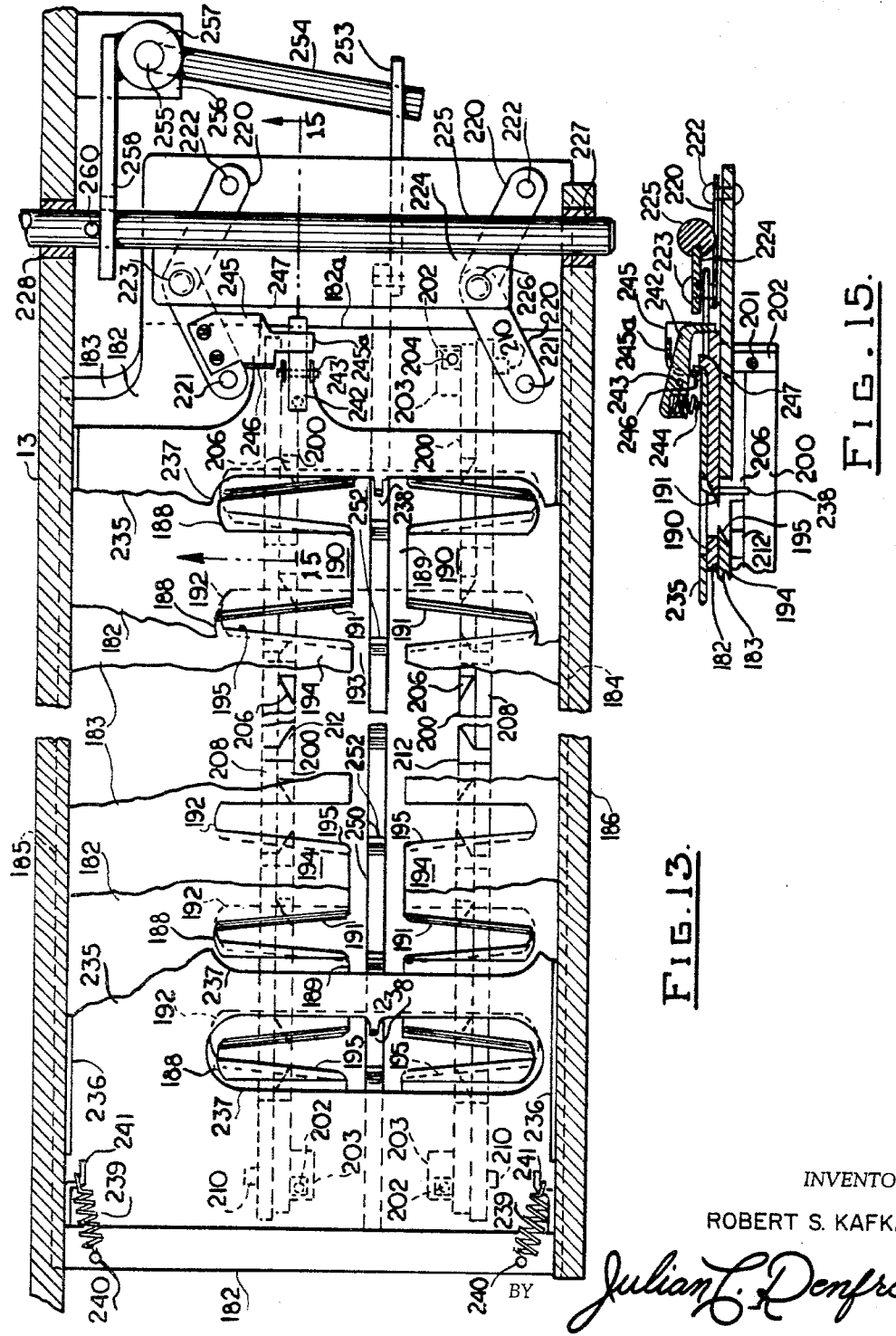

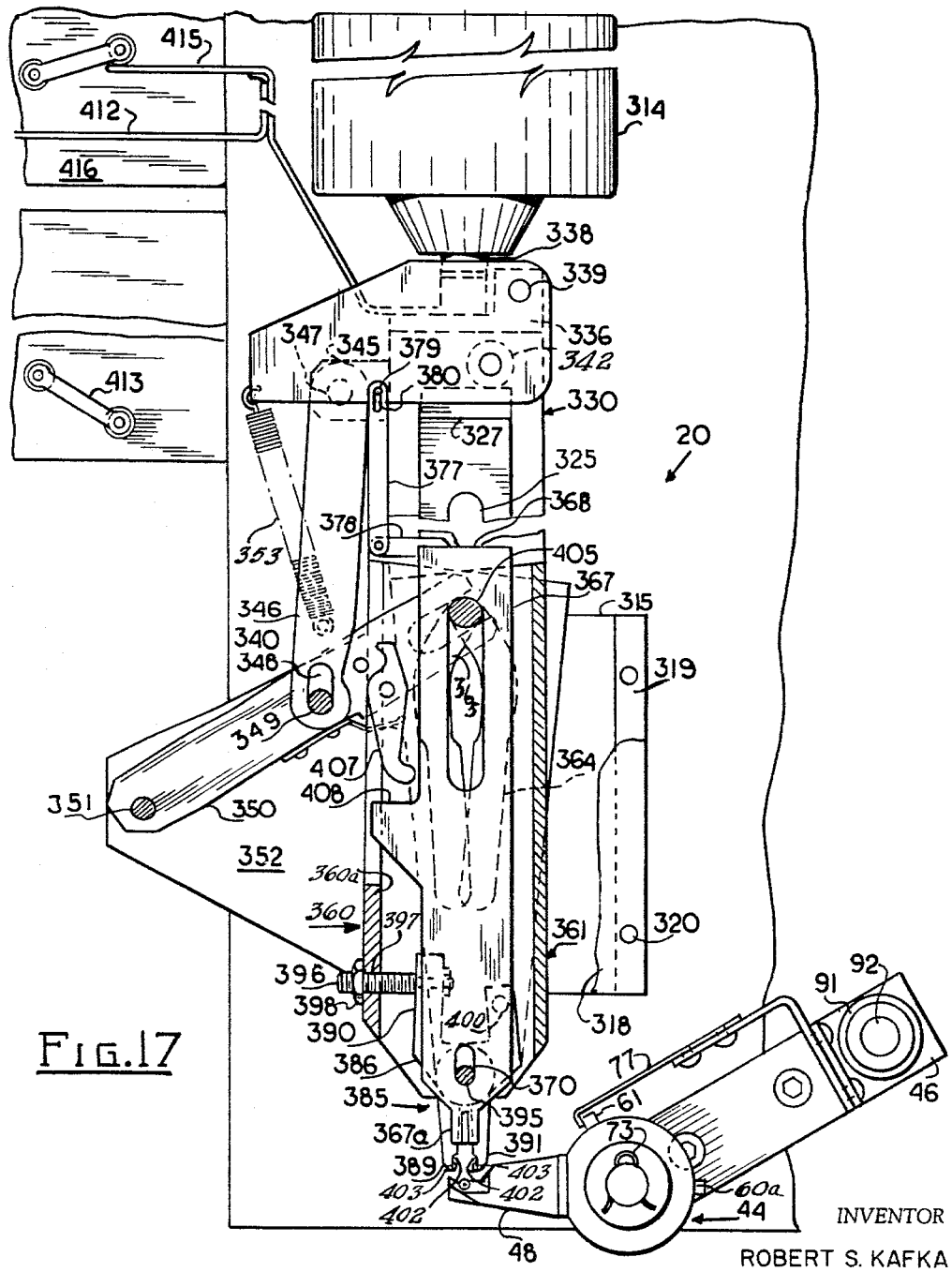

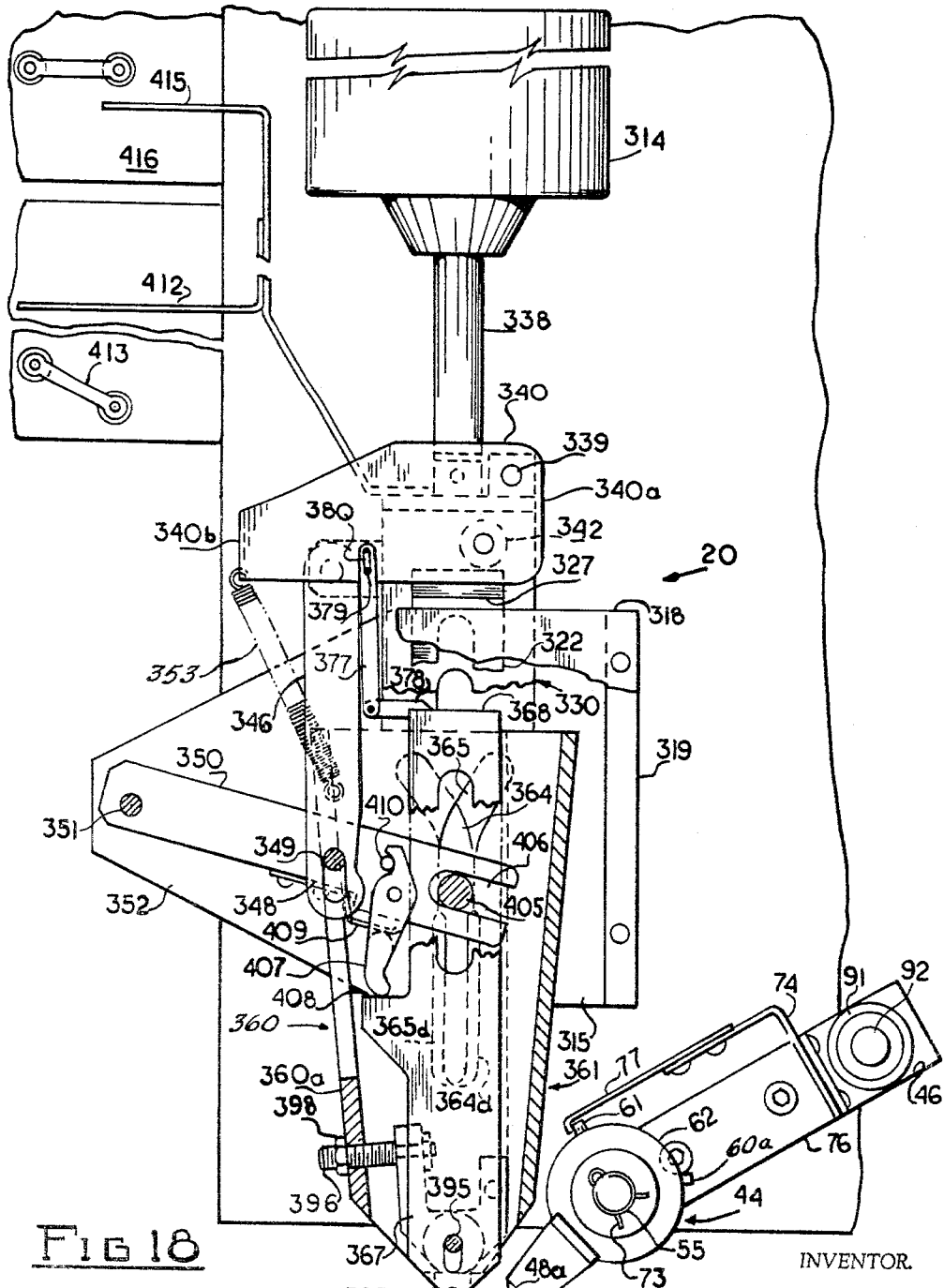

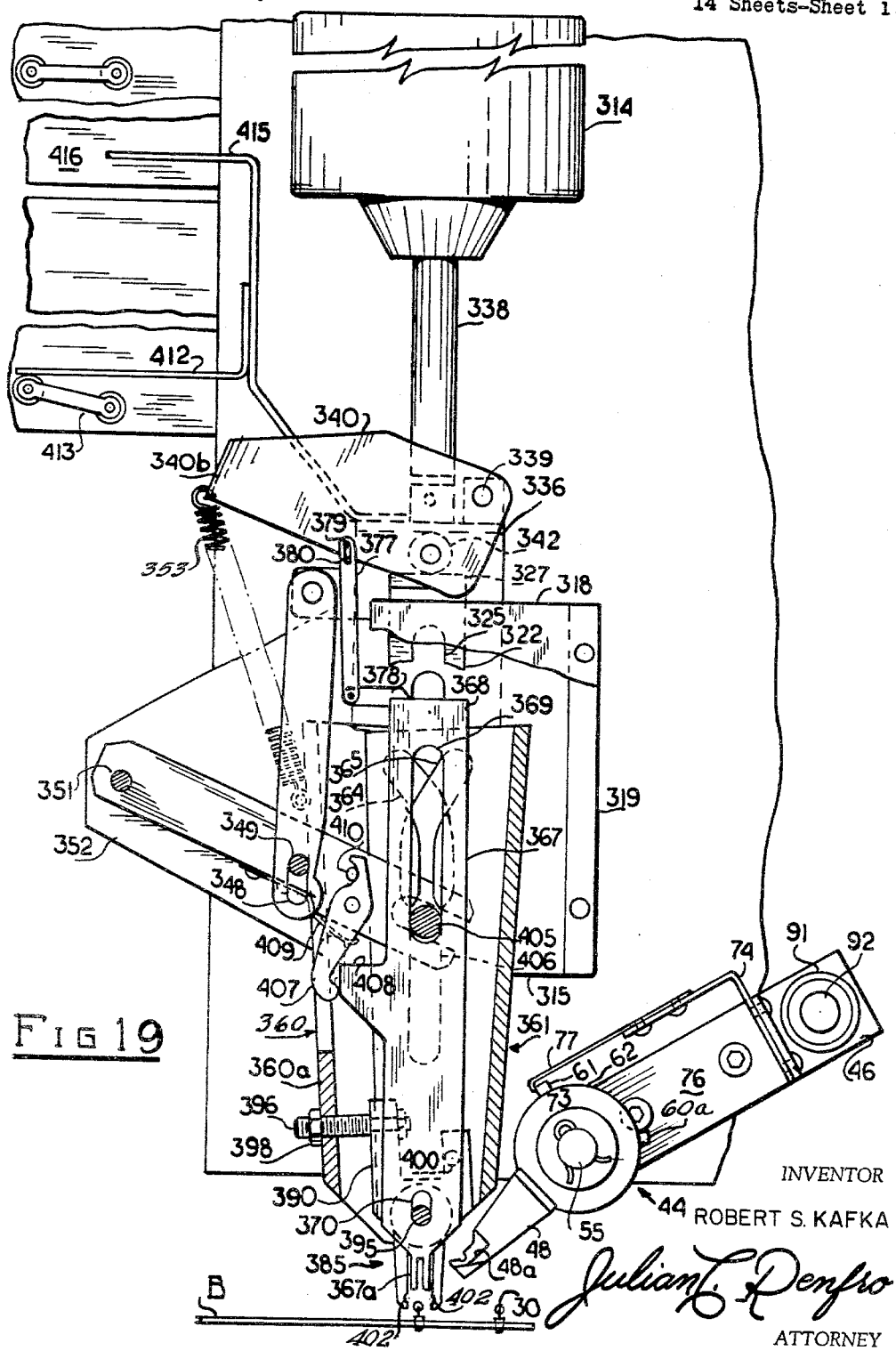

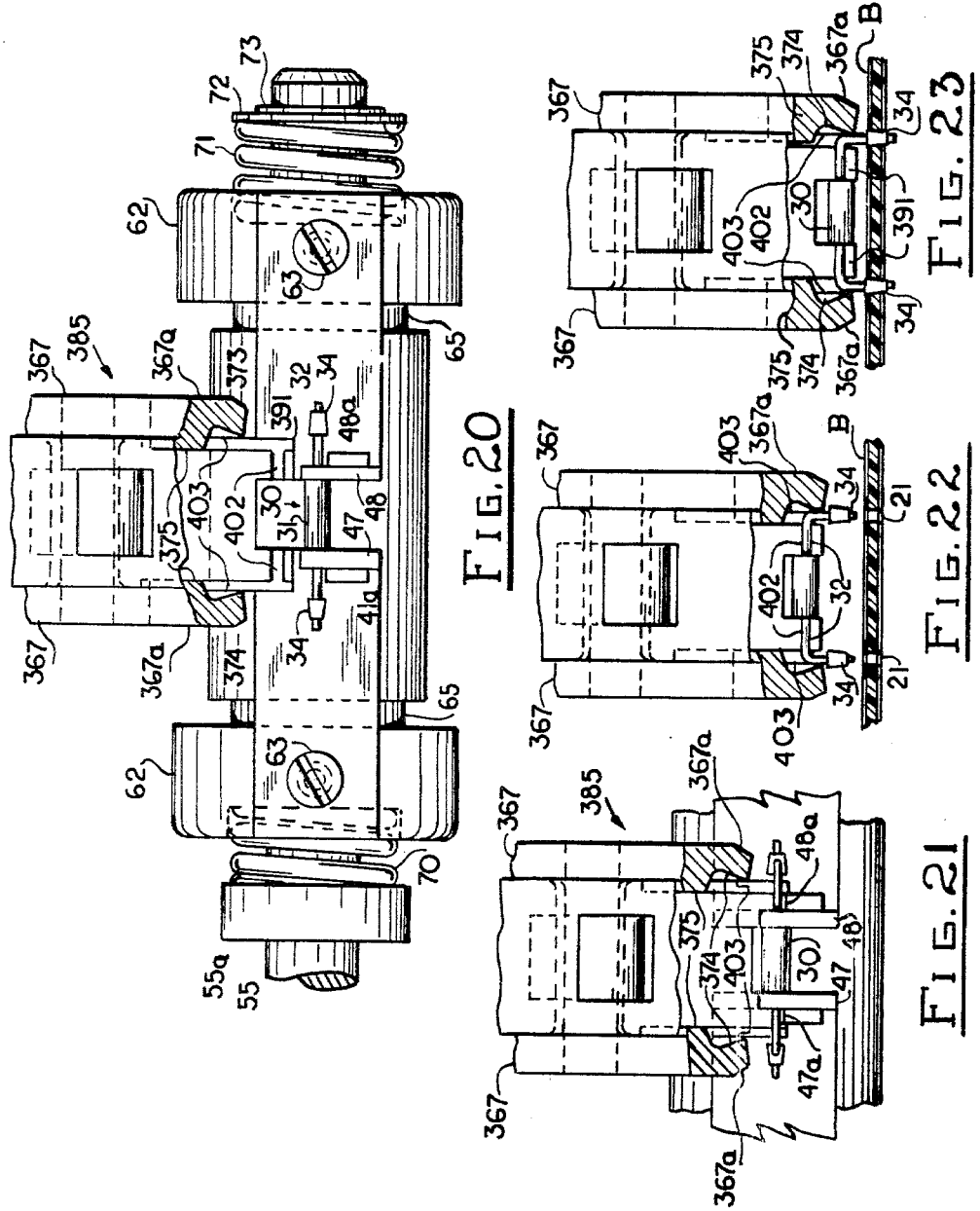

United States Patent Office 3,248,981
Patented May 3, 1966

3,248,981
REMOTE CONTROLLED ARTICLE SELECTOR
AND DISPENSER
Robert S. Kafka, Orange County, Fla., assignor to Martin-Marietta Corporation, Middle River, Baltimore County, Md., a corporation of Maryland
Original application May 7, 1962, Ser. No. 192,946, now Patent No. 3,164,839, dated Jan. 12, 1965. Divided and this application Sept. 16, 1964, Ser. No. 408,447
11 Claims. (Cl. 83—153)

This division of my application Ser. No. 192,946, May 7, 1962, now U.S. Patent 3,164,839, on a Component Forming and Insertion Machine, relates to a novel remote controlled article selector and dispenser apparatus, and more particularly to apparatus for automatically or semi-automatically selecting a component such as an electrical resistor or the like from a number of available components, and transferring the selected component to a work station, so that in accordance with the operation of my patented component insertion concept, the selected component can be mounted at a predetermined site on a printed circuit board or other chassis.

The increased use of electronic sub-assemblies including large numbers of miniature electrical components such as resistors, capacitors, diodes and the like, often having a body as small as ⅛ inch in diameter and ¼ inch in length and mounted by their wire leads on printed circuit boards, has created a demand for apparatus capable of handling and mounting such components quickly and accurately. The usual practice is to cut the axially extending wire leads to a desired length and then to bend the leads at right angles adjacent the body of the component to form a staple-like configuration. The leads are then inserted into pre-formed openings in an insulator board having conductive circuitry thereon and the ends of the leads are crimped below the board to hold the component for later soldering. The bending and inserting operations have been accomplished heretofore either manually with hand tools or by devices having arms which are placed under the leads adjacent the component body to serve as anvils over the edges of which the leads are bent by means such as forming slides. This manner of bending the leads has been found to impose undue stresses on the component body, damaging the same or changing the electrical values thereof. Moreover, size factors have made it necessary in prior art devices to withdraw the anvil arms from beneath the wire leads prior to insertion of the ends thereof into the prepared openings. This leaves the leads relatively unsupported during the inserting and crimping thereof. Thus, it has been impossible heretofore to obtain press fits of the leads in the openings without subjecting the components to strain and the crimping of the leads has led to damaged components.

As taught in my earlier patent cited above, it is quite feasible to provide an improved component lead bending and inserting apparatus which eliminates any likelihood of strain or injury to electrical components such as resistors, capacitors, and the like, through the provision of jaws which firmly grip each component lead adjacent the body with the circumference of the lead being substantially completely engaged by the jaws so that forces applied by forming slides to the end portions of the leads cannot be transmitted therealong inwardly of the jaws to strain or damage the component body when the leads are formed to a staple-like configuration, and which jaws cooperate with the forming slides to substantially surround each of the parallel extending lead ends during insertion, whereby the leads may be forced into the openings with a press fit or may be crimped beneath the board without any likelihood of damage to the component body.

As taught in such patent, a component forming and inserting device can be provided in the form of a head supported by a frame for reciprocal movement by an air cylinder or the like toward and away from a chassis or printed circuit panel, the head including jaws and forming slide means which perform gripping, forming, inserting, and releasing operations in mechanically timed relation to movement of the head, with the jaws and forming means deriving their movements from the movement of portions of the head with respect to the supporting frame by the air cylinder or other power means.

In one preferred embodiment of the earlier invention, the forming and inserting head comprises pincher-like jaw means connected to operating arms for opening and closing the jaw means to grip and hold the wire leads of a component as the head is moved toward a printed circuit board. The operating arms are worked to effect the opening and closing movement of the jaws by actuating means including a pin engaged in cam slots in the operating arms and driven by proportional movement means in the form of a lever connected between the frame and the power means so that the pin moves within the cam slots at a greater rate than the linear movement of the head, thereby causing actuation of the jaws in timed relation to the movement of the head. Forming slide means are included in the head for movement with respect to the jaw means under the influence of the proportional movement lever so as to bend the leads into a staple configuration after they are firmly gripped by the jaws. After the component leads are inserted in the printed circuit board the jaws are opened without further vertical motion to permit retraction of the head by means including a force responsive latch means which collapses under a predetermined force to allow the air cylinder to cause the actuating means to open the jaws without further downward movement thereof and to retract the forming slides, after which the head is withdrawn from the chassis with the jaws remaining open so that component will not be withdrawn, the jaws and forming slide means then being brought to readiness to grip, form, and insert a subsequent component.

Electronic sub-assemblies of the type produced by this invention usually comprise a variety of components such as resistors, capacitors, and the like mounted on a printed circuit panel in a predetermined arrangement with many of the components having differing electrical values. The components are obtainable from suppliers in loose bulk form or in roll form, with the roll consisting of a plurality of like components held in side by side, spaced relation by tapes or webs, and coiled on a suitable spool. Component forming and mounting mechanisms have been proposed heretofore which utilize one or more supplies of components in tape or loose form, and in some instances for mounting components of different electrical values in the proper order on a printed circuit panel. Such mechanisms have not been entirely successful for automatic or even semi-automatic use because the small size of the components, and the propensity of the leads thereof to become inadvertently bent, has led to frequent jamming of the mechanisms, skipping of components in the sub-assemblies, and improperly mounted components.

Accordingly, it is an important object of the present invention to provide an improved component assembling apparatus which will select a component of proper electrical value from a plurality of supply stations having components arranged in magazines or on tapes, and which apparatus maintains positive control over the position of each component at all times so as to eliminate any likelihood of jamming of the apparatus, improper positioning of a component, or the like.

As another object this invention aims to provide an improved mechanism for selecting a component and transferring a selected component from a supply station to a work station for delivery to a component placing means such as the aforementioned forming and inserting head, the mechanism including a transfer carriage having component gripping transfer jaw means which are actuated to grip a component at a selected supply station, transfer the component to the work station where it is proffered to the component assembling head, and then automatically release the component after it has been gripped by the head.

Still another object of this invention is the provision of a selecting and transfer mechanism of the foregoing character comprising means for severing the component supporting tapes and trimming the wire leads of a selected component at its supply station while positioning the component for gripping by the jaws of the transfer carriage for removal to the work station.

Another object of this invention is the provision of a particularly reliable and efficient mechanism for carrying out the feeding, severing, trimming, and transfer of a selected component in a predetermined sequence established by a novel mechanical linkage including a force responsive latch mechanism for directing the power of a single air cylinder or other prime mover in a predetermined sequence to the various means for performing these functions.

The sequential or phased relationships of the feeding, cutting, and transfer functions are achieved in apparatus embodying this invention by mechanical linkage means including a first member for selectively producing rotary movement in a second member and translational movement in a third member, the means including force responsive latch means which prevents the translational movement of the third member until a predetermined resistance to movement is met by the second member, and thereafter effects a substantial transfer of force to the third member. In a preferred form the first member comprises a lever adapted to actuate the feed mechanism and having a hub mounted for helical movement on a shaft supported on the frame of the apparatus. The shaft comprises the second member of the linkage and is connected to the transfer means, while the third member comprises a lever connected to the cutting means and operable by movement of the hub along the shaft. The pressure responsive latch means includes an arm pivoted to the frame and biased in a position making a small angle with the axis of the shaft and opposing translational movement of the hub along the shaft, whereby large components of force tending to move the hub along the shaft are resisted by a relatively small biasing force on the arm, but when the biasing force is overcome the arm is moved aside and the resistance to translational hub movement diminishes rapidly, thereby allowing a large force to be exerted to operate the third member for actuating the cutting means.

Yet another object of this invention is the provision of automatic component selecting, forming, and mounting apparatus incorporating means for automatically carrying out these functions in accordance with the positioning of a chassis or printed circuit panel in predetermined positions with respect to the forming and inserting head, whereby components of different electrical values are mounted at the proper predetermined site on the printed circuit panel regardless of the order in which they are mounted.

The invention contemplates means for establishing the positional relationship of the panel to the inserting head and for simultaneously conditioning the apparatus to provide the component which should be mounted at the corresponding site on the panel. For example, the panel may be positioned by aligning a probe connected thereto, with one of a series of openings in a suitable template as a fixed reference, while the probe completes an electrical circuit through a contact in the selected opening, which circuit conditions the apparatus to select the appropriate components.

The invention further contemplates the use of automatic means for positioning the panel and simultaneously conditioning the apparatus, for example through the use of a punched tape controlled conveyor table having positioning capabilities along both X and Y axes.

Other objects and advantages of this invention will become apparent from the following detailed description of a presently preferred embodiment thereof taken in conjunction with the accompanying sheets of drawings forming a part of this specification and in which:

FIG. 5 is an enlarged fragmentary view taken along line 5—5 of FIG. 2 and illustrating a component transfer head;

FIG. 6 is a view taken along line 6—6 of FIG. 5;

FIG. 7 is a view taken along line 7—7 of FIG. 6;

FIG. 8 is an exploded view illustrating parts of the transfer head of FIG. 5;

FIG. 9 is an enlarged fragmentary view of the rear of the apparatus with parts removed and broken away to reveal other elements;

FIG. 10 is an enlarged view of a portion of the apparatus drive mechanism as viewed substantially along line 10—10 of FIG. 2;

FIG. 11 is a front view of a component feeding and shearing portion of the apparatus, with some parts broken away for clarity;

FIG. 12 is an enlarged fragmentary sectional view illustrating a segment of the mechanism of FIG. 11.

FIG. 13 is a view taken substantially along line 13—13 of FIG. 11, with parts broken away to reveal underlying parts;

FIG. 14 is a sectional view of the mechanism of FIGS. 11 and 13, taken substantially along line 14—14 of FIG. 11;

FIG. 15 is a fragmentary sectional view of a component stripper means associated with the portion of the apparatus shown in FIG. 13 and taken along line 15—15 thereof;

FIG. 17 is an enlarged front view, partly in section illustrating the forming and inserting head in retracted position;

FIGS. 18 and 19 are views similar to FIG. 17, but illustrating other positions of the forming and inserting head; and FIGS. 20 through 23 are fragmentary views illustrating sequential movements of parts of the forming and inserting head in grasping a component, bending the leads thereof, and inserting them in a workpiece.

Figure 1:
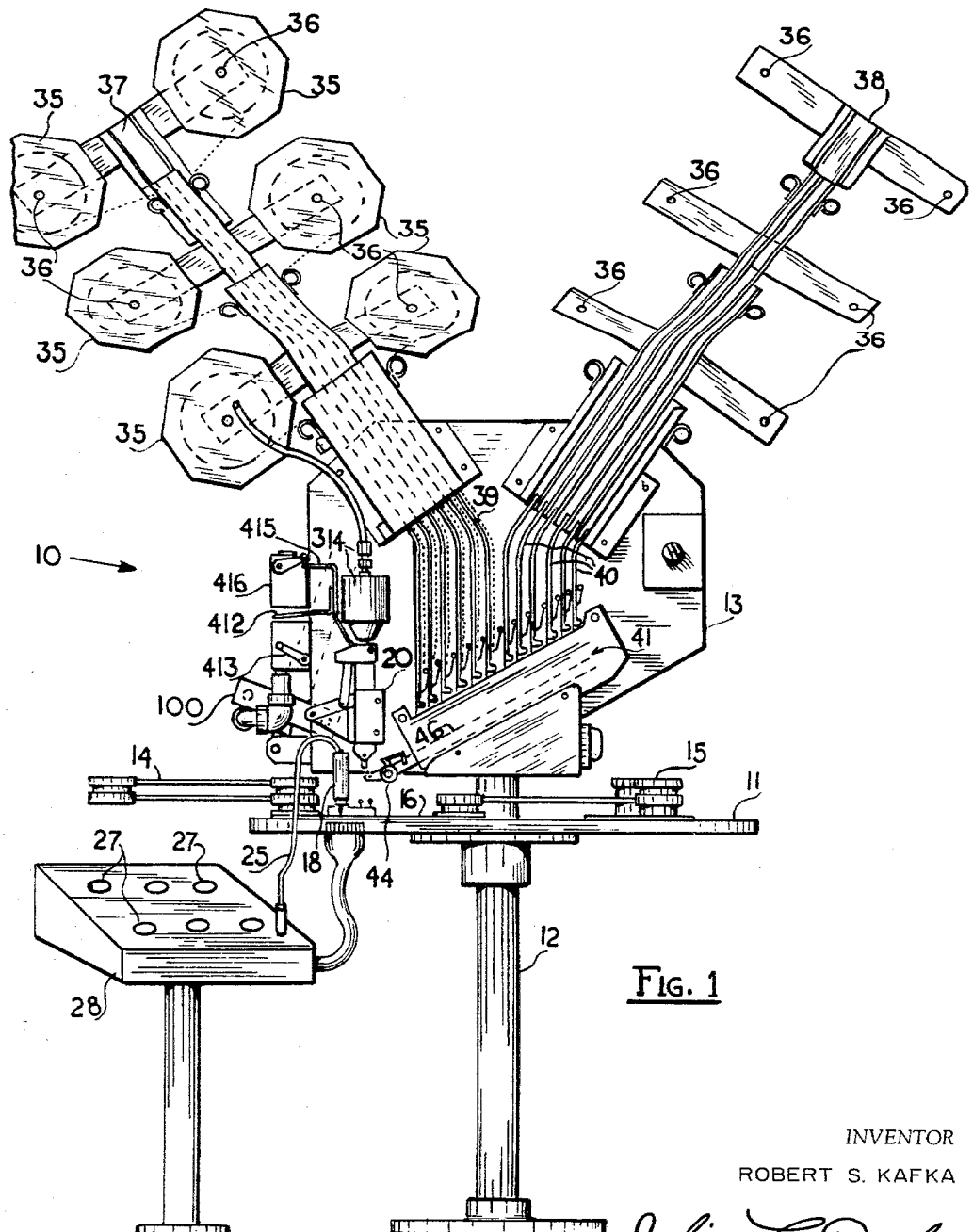
FIG. 1 is a front elevation of a component selecting, forming and assembling apparatus embodying this invention.

Referring to FIGS. 1–4, there is provided an apparatus 10 which comprises, in general, a horizontal table 11 adjustably mounted on a suitable upright 12, and a vertically rising frame plate 13 supported over table 11 by upright 12. Mounted on table 11 are parallel motion producing arm linkages 14 and 15 which are connected to opposite ends of a movable frame 16 in which a printed circuit board B may be secured. Other parallel motion producing means could be substituted for arm linkages 14 and 15, such as well known four-bar linkages. Frame 16 is provided with an arm 17 on which is mounted an upwardly extending handle 18 by which the frame may be moved over the surface of table 11 to selectively position board B beneath a component lead forming and inserting head 20 which is mounted on frame plate 13 for vertical linear movement toward and away from table 11. Forming and inserting head 20, which will later be described in detail, is adapted to mount components on the board B by pressing the component leads into pre-formed openings 21 in the board. A probe 22 extends downwardly from arm 17 and is adapted to cooperate with openings 23 in a guide template 24, mounted on the forward edge of table 11, to determine the site of each component. The template is conveniently formed by using an inverted and reversed printed circuit board similar to board B.

The probe 22 is electrically connected to control means in the apparatus by a wire 25 extending from handle 18, and its insertion into one of the openings 23 in guide template 24 is adapted to complete a circuit which conditions the apparatus 10 to select a predetermined component for mounting by head 20 at the printed circuit board site corresponding to the opening 23 in which the probe is inserted. Alternatively, the apparatus may be operated in a semi-automatic manner in which the probe 22 cooperates with the opening 23 only to select the site at which the next component will be mounted, while the selection of the component itself is accomplished by depressing an appropriate selector button 27 on a control console 28.

As is best seen in FIG. 14 the apparatus is supplied with electrical components 30 having cylindrical bodies 31 and axially extending wire leads 32 which are fixed to spaced parallel tapes 33. Each lead 32 is provided with a tiplet 34 secured thereto in spaced relation to the body of the component. Of course, the components 30 are merely illustrative, and it will be understood that components having other shapes may be handled by apparatus embodying this invention. Also, the tiplets 34 may be omitted, if desired, without affecting the operation of the machine. The taped components are wound on supply rolls or spools 35 rotatably supported on spindles 36 extending from support arms 37 and 38 which are conveniently mounted on frame plate 13. In this instance there are six spools mounted on each arm and each of the spools contains components 30 of a type or electrical value which is different from the components of the other spools. Two groups of guide means or channels 39, 40 lead the components along the arms 37 and 38 and terminate in a series of supply stations generally indicated at 41. The apparatus includes means at the supply stations 41 for shearing the tapes 33 and for clipping the leads 32 thereof to a predetermined length.

*The transfer mechanism*

A transfer head 44 (FIGS. 1, 11 and 12) is mounted for movement along a sloping slot 46 beneath the supply stations. Detail FIGS. 5–8 reveal that this head is provided with jaws 47 and 48 adapted to grasp the body of a selected component from one of the supply stations and to deliver that component to the forming and inserting head 20 (FIGS. 1 and 11) which forms the wire leads 32 at right angles to the component body 31 (see FIG. 14) and inserts the leads in the prepared openings in a printed circuit board B supported in frame 16 on table 11.

Referring now more particularly to FIG. 8, the transfer head 44 comprises a shaft 55 which has two recesses 56 for keys 57, and an annular groove 58 which receives semi-circular half-rings 59. A sleeve 60 surrounds the half-rings 59 and is rotatable with respect to shaft 55 but is restrained from moving sideways by a screw 61 engaging one of the half-rings 59. Jaws 47 and 48 are secured to sleeve-like jaw carriers 62 by screws 63. Carriers 62 are slidably received on shaft 55 with keyways 64 receiving keys 57, and having reduced end portions 65 received within the ends of sleeve 60.

Sleeve 60 has a pair of diverging cam slots 68 having helical portions 66a and straight portions 66b. See also FIGURE 6. The jaws and jaw carriers are biased inwardly toward one another by a spring 70 acting between a shoulder 55a on shaft 55 and one jaw carrier, and a spring 71 acting between a washer 72 and the other jaw carrier. Washer 72 is retained on shaft 55 by a snap ring 73. An L-shaped bracket 74 is secured to a carriage block 76 disposed in slot 46 and carries a hook 77 which is adapted to engage screw 61 and restrain sleeve 60 against counterclockwise rotation beyond the vertical position of screw 61. It will be appreciated that if jaws 47 and 48 are moved downwardly from the horizontal position of FIGS. 1 and 11 to the depressed position of FIG. 18 while sleeve 60 is held stationary, the pins 67 will move in cam slots 66 and will effect opening of the jaws. Conversely, if shaft 55 is held stationary sleeve 60 may be rotated with respect to the shaft and cam slots 66 will act on pins 67 to effect opening and closing of the jaws.

Shaft 55 is secured in a socket 85a of a shaft 85 which extends through and is journaled in the carriage block 76 and terminates in widely spaced ball bearings 86 in one end of a drag link 87, the other end of which is secured by a pin 88 to a transfer head moving swing arm 89. The size and spacing of bearings 86 serve to hold shaft 85 square and true with respect to the frame plate as the swing arm 89 moves the carriage along slot 46. A cam 90 is fixed to shaft 85 between the carriage block 76 and the drag link 87. A roller 91 is mounted at the forward end of carriage block 76 by means of an axle pin 92 which conveniently serves as a pivot pin for one end of an arm 93 which carries at its other end a detent roller 94 which is engaged with the periphery of cam 90. Roller 94 is biased towards cam 90 by a spring 95 acting between arm 93 and carriage block 76, and cooperates with cam 90 to determine the angular position of shaft 85 and hence of jaws 47 and 48 in a manner which will presently become apparent.

Referring to FIG. 9, the periphery of cam 90 comprises first and second indented portions or recesses 97 and 98. When the cam is in its full line position, roller 94 cooperates with recess 97 to hold the transfer jaws 47, 48 in a horizontal position. Roller 94 cooperates with recess 98 to hold the transfer jaws in a position in which they have been depressed approximately 45° into their FIG. 18 position for a purpose which will later become apparent. Cam 90 has an arcuate or constant rise portion 99 which drives roller 94 outwardly against the action of spring 95 when the cam is rotated to its dotted line position of FIG. 9 to bring jaws 47, 48 into a substantially vertical position as shown in FIG. 12. These various jaw positions will be related to the selecting and transfer of the components as the description proceeds.

Figure 2:
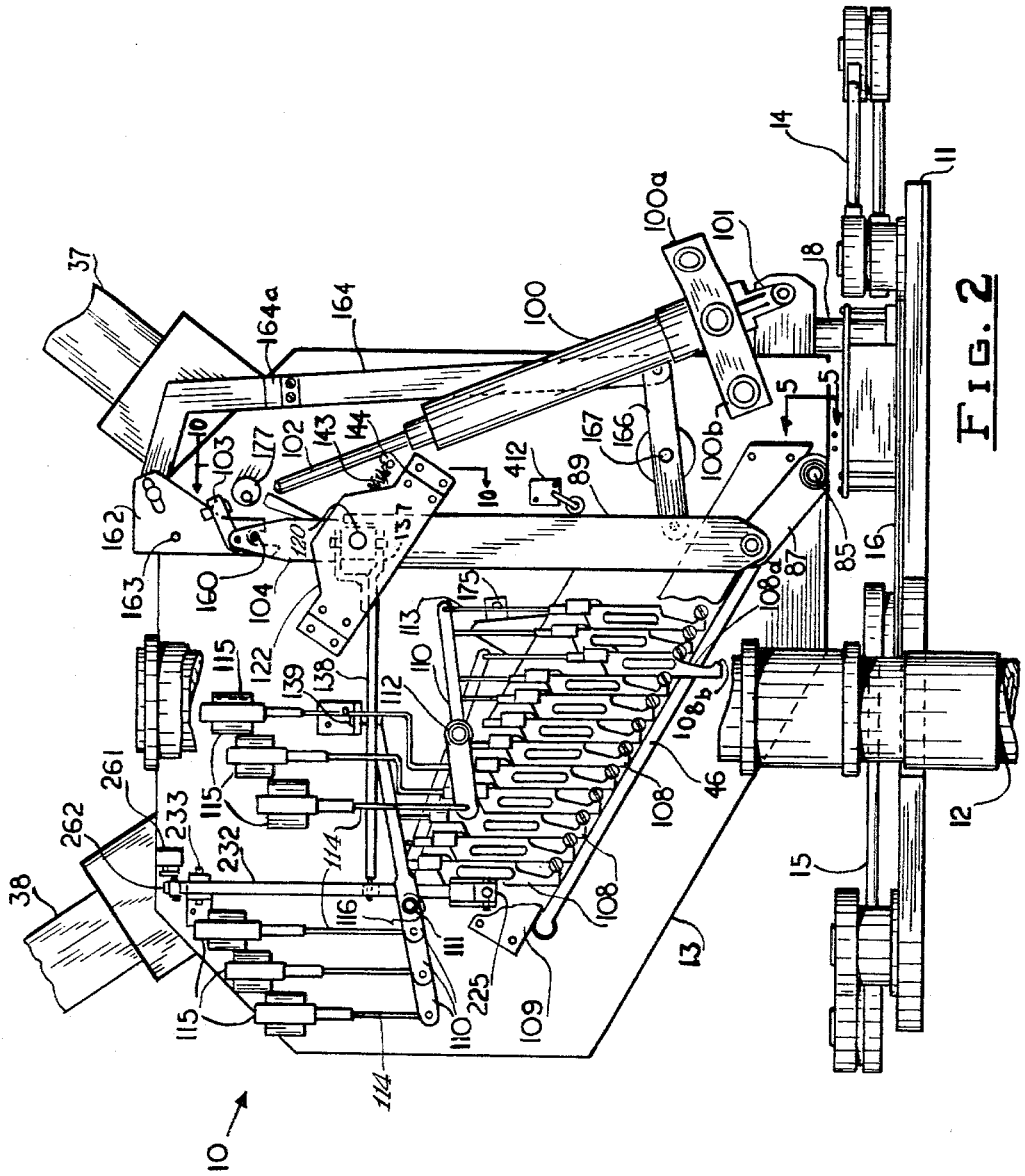
FIG. 2 is a rear elevation, on an enlarged scale of the main body of the apparatus of FIG. 1.
Figure 3:
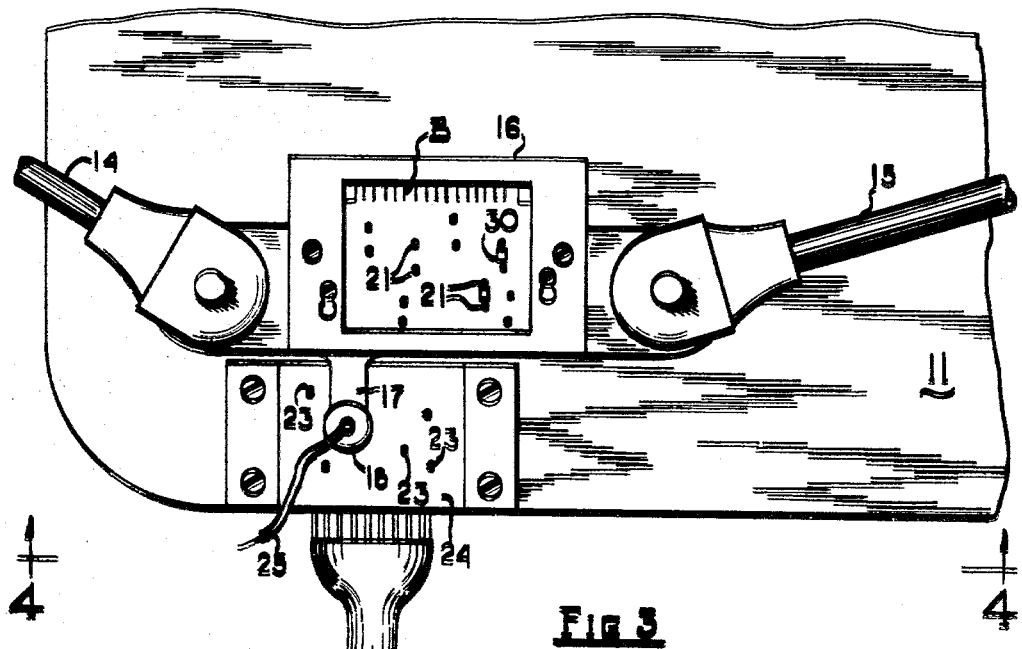
FIG. 3 is an enlarged fragmentary plan view of a workpiece supporting portion of the apparatus.
Figure 4:
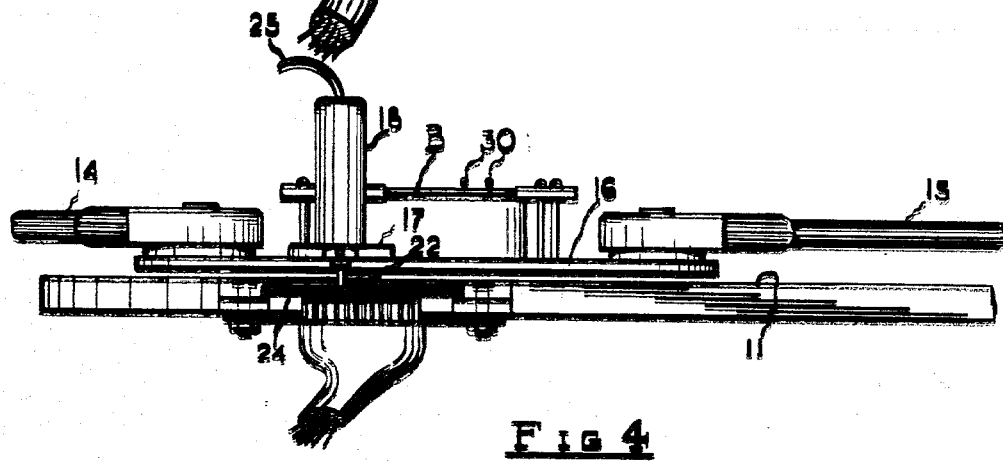
FIG. 4 is a front elevation of the portion of the apparatus shown in FIG. 3.

The carriage block 76 and transfer head 44 are moved along slot 46 to a position below a selected one of the supply stations 41 by the swing arm 89 (see FIGS. 2 and 5) which derives its movement from a double acting pneumatic cylinder 100 which is connected at its lower end by a universal joint 101 to the frame plate 13 and has a piston rod 102 connected by a spherical joint 103 to the upper end of a lever arm 104. See FIG. 10. The air cylinder 100, which is controlled by pilot valves 100a and 100b, not only operates swing arm 89 to move the transfer head 44, but also provides the motive power for effecting component feed at the supply stations and for operating the tape shearing and lead cutting mechanisms all in a precise, mechanically phased relationship. In FIG. 2, cylinder 100 is shown in the extended position.

Means are provided for arresting the transfer head 44 beneath a predetermined one of the supply stations 41, the means comprising a plurality of vertically reciprocable slides 108, each of which corresponds to a supply station. Note FIG. 2. The slides 108 are supported above slot 46 in side by side relation by bracket means 109 and are adapted to be individually lowered into the path of the shaft 85 supporting the transfer head 44. To this end, there are provided two groups of levers 110, the levers of one group being centrally pivoted to frame plate 13 at 111, and the other group at 112. Each slide 108 is connected by a rod 113 to one end of a lever 110, the other end of which is connected by a rod 114 to a solenoid 115. Spiral springs 116 (FIG. 2) act on the levers 110 to bias the slides 108 into a normal position retracted above slot 46. The solenoids 115 are energized to lower the slides 108 by completion of electrical circuits made by probe 22 in the openings of guide template 24, or by pushing a selector button 27. Thus, if a component having a certain value is destined for a specific site, the slide at the proper supply station will be lowered. Each slide 108, one of which is shown in the lowered position in FIGS. 2 and 9, comprises a portion 108a for direct engagement by shaft 85 and a portion 108b for engagement by a nose 119 of cam 90 for rotating the latter into the dotted line, jaw elevating position of FIG. 9.

Referring now to FIG. 10, swing arm 89 is pivoted at its upper end to frame plate 13 by a shaft 120 which has one end journaled in a bearing block 121 and has its other end journaled in a U-shaped bracket 122 mounted on the frame plate. Shaft 120 is secured to swing arm 89 by a pin 124. Air cylinder arm 104 is secured to a sleeve 125 having helical cam slots 126 therein and provided with an annular shoulder 129. Sleeve 125 is slidably received on shaft 120 and a pin 128 extends through the shaft with its ends engaged in cam slots 126. A block 130 having a bore 131, a flange 132, and trunnions 133, surrounds sleeve 125 and is retained against shoulder 129 by a snap ring 134 lodged in a groove 135 of the sleeve. Trunnions 133 are engaged by the forked end 137 of a horizontal lever 138. See FIGURE 2. Lever 138 is pivoted to frame plate 13 by a vertical pin 139 for movement in a horizontal plane and serves to drive the shearing and cutting portions of the apparatus described more fully hereinafter.

It will be recognized that a contractive force exerted by air cylinder 100 tending to rotate lever arm 104 and sleeve 125 in a clockwise direction about shaft 120, as viewed in FIG. 2, will be divided by cam slots 126 and pin 128 (see FIG. 10) into one component of force tending to rotate swing arm 89 with lever arm 104, and another component of force tending to cause translation movement of lever arm 104, sleeve 125, and block 130 along shaft 120 so as to move end 137 of lever 138 away from frame plate 13. This translation movement, which is utilized to operate the mentioned shearing and cutting mechanisms, is opposed during movement of swing arm 89 by a roller 140 acting against shoulder 132 of block 130. Roller 140 is carried at the end of an arm of a lever 141 which is pivoted to the frame at 142. A spring 143 is connected between a bracket 144 and the other end of lever 141 and biases roller 140 against shoulder 132. An adjustable stop member 145 is mounted on shoulder 132 and may be positioned by a screw 146 to limit movement of roller 140 along the shoulder and serving to establish the minimum angle which a line connecting the pivot 142 and the center of roller 140 will make with the axis of shaft 120. By keeping this angle small, a light spring 143 acting through roller 140 can resist large components of force tending to move block 130 laterally along shaft 120, and hence make effective those components of force tending to rotate shaft 120 and move swing arm 89. When, however, swing arm 89 is arrested, as by engagement of shaft 85 with a slide 108, the lateral components of forces generated by pin 128 and cam slots 126 and acting against roller 140 are increased until the effect of spring 143 is overcome. When this occurs, the resistance offered by roller 140 collapses suddenly as the roller is pushed aside and lever arm 104 continues to rotate about shaft 120, and block 130 moves laterally along the shaft so as to effect lateral movement of lever 138.

The foregoing arrangement permits a large percentage of the force of air cylinder 100 to be utilized in positively moving swing arm 89 and transfer head 44 until stopped by a slide 108 at any one of the supply stations, and then serves to transfer a large portion of the driving effect of the air cylinder to movement of lever 138 from which other, later described portions of the apparatus are operated.

*Component feed*

The operation of air cylinder lever 104 is also utilized to perform a component feeding operation at a selected one of the supply stations.

Referring to FIGS. 11 and 14 there are provided a plurality of drive pawls 148 disposed at the lower ends of the guide means, one for each supply station. Each pawl 148 is comprised of a sheet metal blade swingably mounted on a shaft 149 and comprising tines 150 for engagement of component leads 32 adjacent the tapes 33. The supporting shafts 149 extend through elongated hubs 151 extending horizontally through an opening 152 in frame plate 13 from a pawl carrier 153. Secured on the inner ends of shafts 149 are enabling cams 154 (FIG. 9) which are disposed adjacent stop slides 108 only one of which is shown in FIG. 9. The pawls 148 are resiliently coupled to the shafts 149 by springs 155, secured to shafts 149 by collars 156 and bearing against the pawls. A spiral spring 157 surrounds each shaft 149 between the cam 154 and pawl carrier 153 and acts to swing the pawl 148 out of engagement with the taped components. Each cam 154 is adapted to be engaged by a shoulder 158 on the adjacent slide 108 when the latter is projected downwardly by its solenoid 115 into a transfer head stopping position. This engagement of cam 154 effects rotation of shaft 149 to bring the pawl 148 associated with that station into engagement with the lead wires 32 of the penultimate components.

The pawl carrier 153 is actuated to lower all of the pawls 148 simultaneously; however, only that pawl which is placed in engagement with the component leads at the selected station is operative to perform a feeding operation. To accomplish lowering of carrier 153, lever 104 is provided with a sear pin 160 which is adapted to engage in a slot 161 in one end of a rocker arm 162. Rocker arm 162 is pivoted at 163 to frame plate 13 and is connected at its other end to the upper end of a pull rod 164. Pull rod 164, which is adjustable in length at 164a, has its lower end pivoted by pin 165 to one end of a lever 166.

Lever 166 is pivoted centrally at 167 to frame plate 13 and has its other end pivoted at 168 to one end of feed pawl carrier 153. The other end of pawl carrier 153 is connected by a bar 171 to frame plate 13, the bar 171 having one end pivoted to the carrier at 172 and the other end pivoted to the frame plate at 173. Lever 166 and bar 171 form two sides of a four bar parallel movement linkage, with the pawl carrier 153 forming the third bar and the frame plate 13 forming the fourth bar. Because lever 166 and bar 171 are substantially horizontal, carrier 153 is constrained to move substantially vertically through a small arc. The pawl carrier 153 is stabilized by sliding in grooves in guide blocks 174 and 175 mounted on frame plate 13.

When lever arm 104 is in its starting or FIG. 2 position, sear pin 160 is engaged in slot 161 of rocker 162, and carrier 153 is in a raised condition. Upon actuation of air cylinder 100 and the beginning of movement of lever arm 104 in a clockwise direction, rocker 162 is rotated in a counterclockwise direction by the sear pin until the sear pin leaves slot 161 and rocker 162 engages an eccentric stop member 177. This position of rocker 162 is shown in dotted lines in FIG. 9. A tension spring 178 acts between the lever 166 and the frame plate 13 and merely serves to ensure good engagement of the rocker with the eccentric stop member 177. The latter may be adjusted to vary the feed stroke. The counterclockwise movement of rocker 162 raises pull rod 164, causing lever 166 to lower the pawl carrier 153 and effect the advancing of a component at the station selected by lowering of a slide 108.

A spring loaded back pawl 180 is disposed in each of the supply stations below the pawls 148 and cooperates with the guide means 39 and 40 to prevent upward movement of the components when pawl carrier 153 is elevated upon return of lever arm 104 to its FIG. 2 position.

*Tape shearing and lead trimming means*

Tape shearing and lead trimming means are provided at each station in a position to receive a selected component 30 which has been advanced by the foregoing feed mechanism. Referring to FIGS. 11 through 15, the shearing means comprises upper and lower shear plates 182 and 183 which are superimposed and have their side edges slidably received in grooves 184 and 185 of a supply station side plate 186 and the frame plate 13. Side plate 186 is rigidly secured in spaced, parallel relation to frame plate 13 by spacer bars 187.

Plates 182 and 183 float in grooves 184 and 185 and are thereby constrained to longitudinal movement parallel to slot 46 in frame 13. The upper shear plate 182 is provided with elongated openings 188 joined by slots 189 so as to provide individual blades 190 having shearing edges 191 disposed at a small angle with respect to the longitudinal dimensions of the openings. Lower shear plate 183 has similar elongated openings 192 in partial registry with openings 188 and having slots 193 which form blades 194 having angularly disposed shearing edges 195 which are adapted to cooperate with shearing edges 191 to cut the tapes 33 supporting the component 30. The blades 190 are flexible and have a downward set to assure good shearing engagement with edges 195.

Cutter means are provided beneath the shearing plates for trimming the wire leads 32 to a predetermined length and for discarding the end portions of the leads, to which severed pieces of tape 33 remain attached. The cutter means comprises a first pair of cutter bars 200 which are secured by screws 201 to vertical posts 202 which extend upwardly through openings 203 in lower shear plate 183 and are secured by screws 204 to upper shear plate 182. The cutter bars 200 are thereby supported for longitudinal movement with the upper shear plate. Cutter bars 200 comprise cutter blades 206 on the upper edge thereof having vertical cutting edges aligned with the inner surface of the cutter bar.

A second pair of cutter bars 208 are secured by screws 209 to vertical posts 210 which are in turn secured by countersunk screws 211 to the lower shear plate 183 for movement therewith. Cutter bars 208 have cutter blades 212 which extend over the upper edge of cutter bars 200 and have vertical cutting edges which cooperate with the vertical cutting edges of blades 206. Cutter bars 208 are provided at their lower edges with flanges 214 carrying gib plates 216 which bear against the lower portions of cutter bars 200 to aid in positive alignment of the cutter blades 206 and 212.

The shear plates 182 and 183 and their associated cutter bars are moved in opposite directions by four toggle bars 220, two of which are secured by pivot pins 221 to the upper shear plate, and the other two of which are secured by pivot pins 222 to the lower shear plate. One pair of toggle bars 220 is pivoted at 223 to a metal leaf or plate 224 which is secured in a horizontal slot in a transversely extending push rod 225. The other pair of toggle bars 220 is pivoted at 226 to plate 224. Push rod 225 extends through, and is reciprocable in openings 227 and 228 in side plate 186 and frame plate 13. The end of push rod 225 which extends through plate 13 is pivoted at 231 to a forked end of a vertically extending lever 232, as shown in FIGS. 9 and 14. Lever 232 is pivoted at its upper end to a bracket on plate 13 by a pin 233 for movement toward and away from frame plate 13. The central portion of lever 232 is provided with an opening 234 in which is received one end of lever 138 which is at 139 pivoted for movement in a horizontal plane by translational movement of block 130 as explained heretofore in connection with FIG. 10.

It will be recognized that movement of push rod 225, to the left as viewed in FIG. 14 will cause toggle bars 220 of FIG. 13 to move toward alignment with one another and will result in spreading of pivots 221 and 222 so as to move the upper and lower shear plates in opposite directions to effect shearing of tapes 33 and trimming of leads 32. Because the shear plates are moved in opposite directions and in equal amounts, the tapes 33 and wire leads 32 will be centered and held in a centered position throughout the shearing and cutting operations. It will be recognized that the shearing and cutting or pinching force which may be achieved by this arrangement will be limited only by the physical strength of the toggle members 220 and their associated pivot pins. Because the cutting or pinching of the leads 32 results in small burrs being formed, the component 30 is held by the cutter blades in position to be grasped by the jaws of the transfer head 44.

In order to prevent any likelihood of component lead burrs interfering with the removal of the component by the transfer head, the apparatus includes stripper means for positively seating the component in the jaws and assisting in its removal. The stripper means, best shown in FIGS. 12, 13, and 15, comprises a stripper plate 235 superimposed on upper shear plate 182 and having upturned side flanges 236 in guided relation with side plate 186 and frame plate 13. Stripper plate 235 has openings 237 in registration with the openings 188 and 192 of the shearing plates, and is provided with depending, component pushing tabs 238 extending downwardly through slots 193.

A pair of tension springs 239 act between posts 240 on upper shear plate 182 and hooks 241 struck out of the flanges 236 of the stripper plate. Springs 239 tend to urge the stripper plate to the left as viewed in FIGS. 12 and 13 to move pusher tabs 238 toward the jaws of the transfer head 44. Means are provided, however, for latching the stripper plate in its illustrated position until the shear plates have started to cut the tapes and component leads. Thus, a spring loaded latch member 242 is pivoted at 243 to the end of the stripper plate adjacent the toggle bars 220, and is adapted to hook over the end edge 182a of the upper shear plate. Latch member 242 is biased into latching position by a spring 244, and is adapted to be tripped during shearing and cutting by a tripper arm 245 mounted on a toggle bar 220, as shown. Tripper arm 245 has a portion 245a overlying the top of latch member 242, the upper surface of which is sloped upwardly going away from the hook thereof.

When push rod 225 is operated to cause toggle bars 220 to move toward alignment with one another so as to initiate shearing and cutting, tripper arm portion 245a sweeps over the loped surface of the latch member, causing it to tilt against the action of spring 244 and to become disengaged with the end of the upper shear plate. The stripper plate is thereby released for movement under the influence of springs 239 to cause the pusher tab 238 at the selected station to seat the component well into the jaws 47, 48 of the waiting transfer head 44. Retraction of the stripper plate is effected by a downturned tab 246 on the tripper arm which engages an upturned tab 247 during opening of the shear means.

Means are provided for closing the vertically directed jaws 47 and 48 of the transfer head 44 when the latter is in a component receiving position beneath a supply station as shown in FIGS. 11 and 12. The jaw closing means comprises a closer bar 250 which is supported in a vertical plane between snap rings 187a on spacer bars 187 beneath the shearing and cut off mechanism. The spacer bars 187 extend through cam slots 251 in the closer bar having straight portions 251a and upwardly sloping portions 251b. Closer bar 250 is provided along its upper edge with twelve projections or teeth 252 and is adapted to be driven through upward and forward movements in which the teeth 252 engage and move a lug member 60a extending downwardly from sleeve 60. The resultant rotation of sleeve 60 causes jaws 47 and 48 to close and grip the ends of the component body 31.

Because the width of cam slots 66 is slightly greater than the diameter of pins 67, the gripping force of the jaws on the ends of the component body 31 is provided by the springs 70, 71. This permits the jaws to firmly grip a component even if it is not exactly centered between the lead pinch-off or cut-off bars, and when the transfer head moves the component away from its supply station the springs 70, 71 will cause the jaws 47, 48 to accurately center the component for grasping by the forming and inserting head 20.

The upward and forward movement of closer bar 250 is produced by cooperation of the spacer bars 187 in cam slots 251 as the closer bar is drawn to the right by a link 253 connected to an arm 254 extending horizontally from a vertical shaft 255. Shaft 255 is journaled in a bracket 256 secured to frame plate 13, and has secured at its upper end a collar 257 from which extends a forked arm 258. Forked arm 258 embraces push rod 225 and is adapted to be moved by a pin 260 extending through the push rod and bearing against the forked end of arm 258. Link 253 has a slotted opening receiving arm 254 which effects operation of the closer bar before the shearing and trimming operations are substantially complete.

A limit switch 261 (FIGS. 2 and 14) is arranged for engagement by an arm 262 extending from the upper end of lever 232 when the toggle members 220 have been driven slightly through an over-center position and the closer bar 250 has closed the transfer jaws. Limit switch 261 actuates pilot valve 100b which reverses the actuation of pneumatic cylinder 100 causing the piston rod 102 to be extended and lever arm 104 and swing arm 89 to be returned to their FIG. 1 positions. As the swing arm moves shaft 85 and cam 90 away from slide 108, the detent spring 95 causes roller 94 to act against the constant rise cam surface 99, effecting clockwise rotation of the cam as viewed in FIG. 9 to bring transfer head 44 to a position with jaws 47 and 48 extending horizontally. Thus, when the transfer head 44 returns to its starting position its jaws proffer the transferred component 30 to the forming and insertion head 20.

*The forming and inserting means*

Referring now to FIGS. 16 through 19, the forming and inserting portion of the apparatus will be described. This portion includes the forming and inserting head 20 which is reciprocably mounted on vertical frame plate 13 for movement toward and away from a printed circuit board B on table 11 by means of an air cylinder 314 mounted on plate 13. A rear guide plate 315 is secured to frame plate 13 and has a vertical slot 316 which is congruent with a vertical slot 317 in a front guide plate 318 which is supported in spaced parallel relation to guide plate 315 by a spacer block 319 and screws 320.

Reciprocably disposed between guide plates 315 and 318 are a plurality of cooperating parts including a pair of stop slides 322 and 323 having elongated slots 324 and 325 which are aligned with, but longer than, slots 316 and 317. Stop slides 322 and 323 have outwardly extending flanges 326 and 327 which overlie, and are adapted to abut, the upper edges of guide plates 315 and 318, respectively, on downward movement of stop slides 322 and 323. Between the stop slides 322 and 323 is disposed a drive slide 330 having spaced slide portions 331 provided with slots 332 which are congruent with slots 324 and 325 of stop slides 322 and 323. The slide portions 331 are provided at their lower ends with slots 334 which are aligned with holes 335 in the lower ends of the stop slides 322 and 323.

Figure 16:
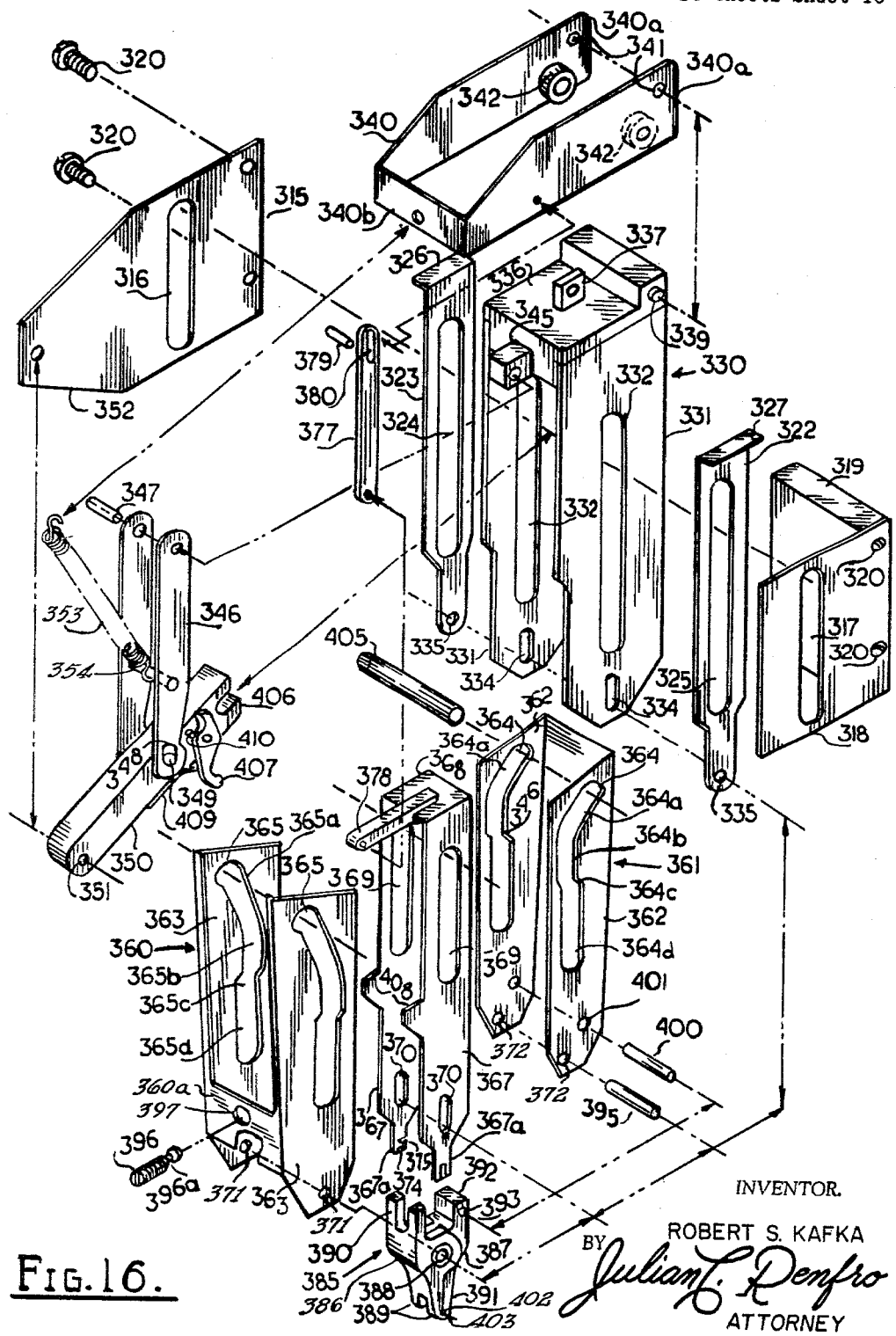
FIG. 16 is an exploded view of the elements of a component forming and inserting head of this apparatus.

The upper ends of slide portions 331 are joined by a drive block portion 336 having an eye 337, illustrated in FIG. 16, which is directly connected to the reciprocable piston rod 338 of air cylinder 314. Block portion 336 has trunnions 339 on which is swingably mounted a yoke 340, pivoted at the outer ends of arms 340a thereof. Yoke 340 has a pair of rollers 342 which are below trunnion receiving openings 341 and offset from a vertical plane therethrough toward the bight portion 340b of the yoke. Rollers 342 engage the upper surfaces of flanges 326 and 327 of stop slides 322 and 323 and form therewith a portion of a force responsive latch means for a limited lost motion connection between the driving slide 330 and the other components of the head 20 for a purpose which will become apparent as the description proceeds.

An eye member 345 is formed on block portion 336 and has pivoted thereto one end of a bifurcated link 346 as by a pin 347. The lower end of link 346 has elongated openings 348 cooperating with a pin 349 to form a lost motion connection with the middle portion of a lever 350. Lever 350 is pivoted by a pin 351 at its outer end to an extension 352 of guide plate 315 which is stationary with frame plate 13. A spring 353 is connected between an anchor pin 354 at the mid portion of link 346 and the bight portion 340b of yoke 340. Spring 353 biases yoke 340 in a counterclockwise direction as viewed in the drawings so as to hold rollers 342 in a position near, but not quite in, alignment with trunnions 339.

Between slide portions 331 of drive slide 330 are disposed a pair of jaw operation arms 360 and 361 with arm 361 having side walls 362 nested between side walls 363 of arm 360. Side walls 362 are provided with cam slots 364 having an angularly disposed upper portion 364a leading downwardly to a vertical portion 364b, a short angular portion 364c and a lower vertical portion 364d. Side walls 363 of arm 360 have cam slots 365 which are the reverse of cam slots 364 and are provided with upper angularly directed portions 365a leading into vertical portions 365b, angular portions 365c and lower vertical portion 365d.

Between the side walls 362 of arm 361 is disposed a pair of forming slides 367 joined by a block 368 at the top and provided with elongated slots 369 aligned with slots 316, 317, 324, 325, 332, and cam slots 364 and 365. The lower portions of forming slides 367 are provided with short slots 370 which are aligned with openings 335 of stop slides 322 and 323, with slots 334 of driving slide 330, and with openings 371 and 372 in operating arms 360 and 361, respectively. A forming slide retracting link 377 is pivotally connected at one end to an arm 378 which extends from the block 368 at the top of the slides, and is connected at its upper end to one arm of yoke 340. The connection with yoke 340 includes a pin 379 riding in a lost motion slot 380 in link 377. The manner in which link 377 retracts the forming slides will presently be explained.

Assembled between the lower ends of forming slides 367 are a pair of component wire lead gripping jaws, generally indicated at 385. Jaws 385 comprise a first jaw member 386 pivoted to a second jaw member 387 by a bushing 388. Jaw member 386 comprises gripping portions 389 and an upper bifurcated portion 390, while jaw member 387 comprises gripping portion 391 and an upper portion 392 having a bore 393. A pivot pin 395 extends through openings 335 of stop slides 322 and 323, slots 334 of driving slide 330, openings 371 and 372 of operating arms 360 and 361, slots 370 of forming slides 367, and bushing 388 of the jaw means 385. Bifurcated end 390 of jaw member 386 is adjustably secured to operating arm 360 by means of a screw 396 having an annular groove 396a in which the bifurcated end 390 is received, with the screw extending through an opening 397 in wall 360a of operating arm 360 and provided with a lock nut 398. The upper end 392 of jaw member 387 is secured to operating arm 361 by means of a pin 400 extending through openings 401 of the operating arm and bore 393 of the jaw member.

The gripping portions 389 and 391 of the jaw members are provided with transverse grooves 402 which permit the jaws to embrace substantially the full circumference of the axially extending portions of leads 32. The gripping portions are also provided with vertical grooves 403 in which the depending end portions of the leads are securely held by the bottom portions 367a of the forming slides 367 to preclude bending of the leads during insertion.

It will be recognized that movement of arms 360 and 361 with respect to one another about pin 395 will cause opening and closing of the jaw means 385, and that the relative positions of the operating arms when the jaw means is closed may be determined by adjusting screw 396. The movement of operating arms 360 and 361 is effected by means of a pin 405 extending through vertical slots 316 and 317 of guide plates 315 and 318, through slots 324 and 325 of the stop slides, through slots 332 of the driving slide, through the overlapping cam slots 364 and 365 and through slots 369 of forming slides 367. Pin 405 is engaged in a slot 406 in the free end of lever 350 which extends between forming slides 367. Lever 350 is also provided with a swingable pawl 407 which is adapted to engage a pair of laterally extending shoulders 408 on the forming slides 367. A pawl spring 409 biases the pawl toward the shoulders 408, with movement of the pawl being limited by stop pins 410 on lever 350.

Referring particularly to FIG. 17 the forming head 20 is shown in its fully retracted or starting position in which pin 405 is at or near the uppermost limit of its travel, wherein the portions 364a and 365a of the cam slots cooperate with the pin to hold the operating arms 360 and 361 toward one another with the jaws 385 opened. Pin 405 is also disposed at the upper end of slots 369 of forming slides 367, thereby holding the latter in its uppermost position with respect to the jaw means 385. The head 20 is positioned with the open jaws over a component 30 being proffered by the transfer head jaws 47, 48 as shown in FIG. 20.

The actuation of air cylinder 314 is initiated by a limit switch 412 which is closed by swing arm 89 as the transfer head 44 is returned to its starting position. As the shaft 338 of air cylinder 314 begins its descent, the force thereof is transmitted through yoke 340 and rollers 342 to the top surface of shoulders 326 and 327 of stop slides 322 and 323, thereby causing the entire head 20 to be lowered between guide plates 315 and 318. As the jaw portions 389 and 391 move down on either side of the lead wires of the component, lever 350 causes pin 405 to move downwardly in guide slots 316 and 317 so as to act in cam slots 365 and 364 to cause operating arms 360 and 361 to move apart and close the jaws on the leads 32.

As the gripping portions 389 and 391 grip the wires and move downwardly, they act against shoulders 47a and 48a of the transfer head jaws, causing the latter to be depressed while hook 77 holds sleeve 60 from rotating. The pins 67 ride outwardly in cam slots 66 causing jaws 47, 48 to open and release the component into the custody of the jaw means 385. The downward movement of jaws 47, 48 causes cam 90 to rotate under roller 94 until it passes the hump between recesses 97 and 98. The roller 94 drops into recess 98 causing the cam to continue to rotate until it comes to rest with jews 47, 48 depressed about 45° as shown in FIGS. 18 and 19. The roller and cam combination serve therefore as a detent so that the spring pressure of the roller against the cam serves to force the cam to rotate due to the slope angle of the cam into one of two positions and remain there until forced out of such position. This movement of the jaws causes pins 67 to lodge in the straight portions 66b of cam slots 66, thereby locking the jaws 47, 48 in an open position.

As the head 20 moves downwardly from the FIG. 17 position to the FIG. 18 position, lever 350 causes pawl 407 to act against shoulders 408 and to cause the forming slides 367 to move down alongside the jaw wire gripping portions 389 and 391 to cause bending of the leads downwardly at right angles to the component body. Because the gripping portions of the jaws 385 have the mentioned grooves 402 which receives the wire leads 32, the leads are gripped around substantially their entire circumference. For this reason the forces exerted on the end portions of the wires by the forming slides 367 are not transmitted inwardly of the jaw means and the component body 31 is protected from any damaging stress or strain. The side surfaces of the jaw gripping portions 389, 391 over which the forming slides move, are preferably tapered inwardly, going in a downward direction, and the forming slides are bowed slightly so as to resiliently follow the taper. This taper, which is so slight as not to appear in the drawings, creates an overbend of the end portions of leads 32 to compensate for "spring-back" of the lead ends when released.

As the head 20 continues down from the FIG. 18 position, the tiplet bearing lead ends are pressed firmly into pre-formed openings in board B, with the tiplets making a tight press fit therein as shown in FIG. 23. Of course, the tiplets may be omitted and the lead ends clinched on the under side of the board. In either case, the forming slide ends 376a cooperate with the grooves 403 in the sides of the jaw members to support the lead ends until fully inserted, and clinched if that is done. This eliminates any likelihood of strain on the component body, or undesired bending of leads.

The height of the table 11 is so adjusted that when the jaw means 385 is a few thousandths of an inch from the upper surface of the board B, and the component is fully inserted, the shoulders 326, 327 of the stop slides bottom against the upper edges of guide plates 315 and 318. When this occurs, the force of air cylinder 314 builds up against rollers 342 until their tendency to roll sideways along shoulders 326 and 327 overcomes the effect of spring 353, and yoke 340 is suddenly tilted allowing drive slide 330 to be moved down with respect to stop slides 322, 323, jaw operating arms 360 and 361, and jaw means 385. This sudden movement of drive slide 330 causes lever 350 to move pin 405 through cam slot portions 64c, 65c, into portions 64d, 65d to effect opening of the jaw means 385, without further movement of the rest of head 20. During this movement of lever 350, pins 410 act on the pawl 407 causing it to be withdrawn from shoulders 408, as shown in FIG. 19. This disconnects the drive means from the forming slides 367 which are at this time at their lowest point of travel, and the upward tilting of yoke 340 acts through link 377 to retract the forming slides at the same time that the jaw means 385 are opened, without further downward movement of the head 20. As lever 350 terminates its downward motion, an arm 412 on drive slide 330 actuates a limit switch 413 which de-activates the air cylinder 314, allowing the internal spring thereof (not shown) to withdraw head 20 and return it to its FIG. 17 position. The transfer jaws, 47, 48, however remain in their depressed, open condition with detent roller 94 engaged in cam recess 98. As the head 20 resumes its FIG. 17 position an arm 415, carried by drive slide 330, engages the arm of a switch 416, thereby releasing an electrical interlock which prevents subsequent operation of air cylinder 100 before the head 20 is fully retracted.

When the apparatus is conditioned to select a subsequent component and air cylinder 100 is actuated to move swing arm 89 and transfer head 44 toward the selected supply station, a shoulder 418 on cam 90 engages a fixed projection 419 on the frame plate so that movement of shaft 85 along slot 46 causes the cam to be rotated counter-clockwise as viewed in FIG. 9 until recess 97 is again brought under the detent roller 94. The resultant rotation of shaft 85 brings the open jaws 47, 48 into a horizontal position in which they remain until engagement of the cam with a slide 108 moves the jaws into their vertical, component gripping position as described heretofore.

From the foregoing detailed description of a presently preferred embodiment of the invention, it will be appreciated that there has been provided thereby an effective and reliable means for selecting a component from a plurality of supplies, trimming the component leads, and transferring the component to a work station. It will also be appreciated that the apparatus includes means, in the form of the head 20, which is capable of forming the leads to a staple-like configuration and, most importantly, to grip the end portions of the leads so as to fully support them until after the insertion is completed.

It is noteworthy that the apparatus maintains positive control of the positions of the components at all times from the selection through the mounting thereof so that there is no likelihood of jamming, skipping, or the like due to free components. It is also noteworthy that the sequence of powered operations is mechanically phased in such a manner that there is no likelihood of operations occurring out of order, or before prior operations are completed. The use of elements which perform a plurality of functions makes the apparatus compact and simple of construction yet reliable in performance. For example, the stop slides 108 provide a positive stop for shaft 85 of the transfer means, effect rotation of the transfer jaws 47, 48 to a vertical position, and operate the enabling cams which make the selected feed panel operative.

The construction of the apparatus on the vertical frame plate 13 leaves the surface of table 11 clear and unobstructed, while the operator has a full view of the circuit board B on which the components are being mounted. The versatility of the apparatus is enhanced by the fact that the transfer head 44 may be easily removed from socket 85a and replaced with one capable of handling other sizes of components, while the head 20 may be disassembled by the removal of the three pins thereof to replace jaw means 385 for the same purpose.

Although the invention has been described in considerable detail and with reference to a specific component selecting and mounting machine or apparatus embodying the invention, it is understood that the invention is not limited thereto, but rather the invention includes all those changes, modifications, substitutions, and uses as are reasonably embraced by the scope of the claims hereof.

The operation of my device is as follows:

After the operator has moved handle 18 to cause the probe 22 to cooperate with a selected opening in guide template 24, a circuit is completed which causes the apparatus 10 to select a predetermined component for mounting by head 20 in the corresponding position on printed circuit board B. That this may be brought about, a slide 108 of the channel corresponding to the selected component is moved into operative position by its respective solenoid, and the double acting air cylinder 100 is actuated to cause the feed finger of the selected channel to move a taped component into position such that the clipoff-pinchoff blades at the proper time can part the component from its tapes.

The transfer head 44 is moved along slot 46 by the operation of swing arm 89, which in turn is operated by air cylinder 100 through a pressure latch arrangement. Upon the swing arm reaching the selected slide 108, the transfer jaws 47 and 48 of head 44 are caused to rotate upward to the component-engaging position.

At this point the motion of the air cylinder arm overcomes the lever force, moving the arm axially to drive the blade assembly and cause the component to be released to the transfer jaws, which clamp the ends of the component and center same. The limit switch 261 is then operated causing the air cylinder to retract, thus causing the swing arm to start back to its original position, moving the transfer jaws which rotate to the horizontal position. The transfer jaws then move to the transfer position below and in line with the insertion jaw means 385, which thereafter start in the downward direction in the open position. The insertion jaws contact the transfer jaws and close over the component leads, with the transfer jaws being rotated by contact with the insertion jaws to the downward position, which causes the transfer jaws to be opened.

As the insertion jaws continue to descend with the component, the forming slides 367 descend so as to bend the component leads and clamp them against further bending. The insertion jaws reach the limit of their travel at such time as the component leads have been inserted in the printed circuit board and thereafter without further travel the insertion jaws open and the forming slides retract so as to release the component. The jaws then return to the start position in order that the next component may be inserted.

Having described my invention, I claim:

1. Apparatus for selecting an article from one of a plurality of supply stations and transferring the article to a work station, said apparatus comprising:
   (a) a frame,
   (b) means defining a plurality of supply of stations arranged in side-by-side relation on said frame,
   (c) a transfer carriage mounted on said frame for guided movement transversely of said stations,
   (d) limit means actuable to restrain said carriage in article receiving positions with respect to said supply stations,
   (e) releasing means for delivering an article from said supply station into the custody of said transfer carriage,
   (f) drive means connected to said transfer carriage and to said releasing means to effect sequential operation thereof,
   (g) said drive means comprising a motion producing element, a linkage including a first section between said element and said carriage and a second section between said element and said releasing means, and force responsive latch means for holding said second section inoperative during unrestrained operation of said first section and actuable to permit operation of said second section upon restraint of said first section by said limit means.

2. Apparatus for selecting an article from one of a plurality of supply stations and transferring the article to a work station, said apparatus comprising:
   (a) a frame,
   (b) means defining a plurality of component supply stations arranged in side-by-side relation on said frame,
   (c) feed means for advancing a component at a selected one of said stations,
   (d) transfer means mounted for movement in a predetermined path across said supply stations and including jaw means for gripping said advanced component, (e) limit means movable into said path to halt said transfer means at said selected station, (f) jaw closer means operative on said transfer means to close the jaws thereof when at said station, (g) drive means for actuating said feed means, moving said transfer means, and operating said jaw closer means in sequence, (h) said drive means comprising a first arm pivoted to said frame and connected to said feed means, a second arm pivoted to said frame and connected to said transfer means, a third arm pivoted to the frame and connected to said jaw closing means, power means connected to said first arm to effect movement thereof, and force responsive latch means connecting said second arm to said first arm for movement therewith until said transfer means is stopped by said limit means, said latch means being operative to prevent movement of said third arm during said movement of said second arm, and operative upon stopping of said second arm to connect said third arm to said first arm for movement therewith.

3. Apparatus for selecting an article from one of a plurality of supply stations having a series of articles supported on tapes, and for transferring the article to a work station, said apparatus comprising (a) a frame, (b) means defining a plurality of component supply stations arranged in side by side relation on said frame, (c) feed means for advancing a tape supported component at a selected one of said stations, (d) transfer means mounted for movement in a predetermined path across said supply stations and including jaw means for gripping said advanced component, (e) limit means movable into said path to halt said transfer means at said selected station, (f) jaw closer means operative on said transfer means to close the jaws thereof on said component when at said station, (g) shear means disposed at said supply stations and operable to sever the tape supporting said component, (h) drive means for actuating said feed means, moving said transfer means, operating said shear means and said jaw closer means in sequence, (i) said drive means comprising a first arm pivoted to said frame and connected to said feed means, a second arm pivoted to said frame and connected to said transfer means, a third arm pivoted to the frame and connected to said shear means and said jaw closing means, power means connected to said first arm to effect movement thereof, and force responsive latch means connecting said second arm to said first arm for movement therewith until said transfer means is stopped by said limit means, said latch means being operative to prevent movement of said third arm during said movement of said second arm, and operative upon stopping of said second arm to connect said third arm to said first arm for movement therewith.

4. Apparatus as defined in claim 3 and wherein said transfer means comprises a shaft, said jaw means being mounted on said shaft and movable therealong toward and away from one another, means disposed between said jaw means for effecting movement away from one another, and spring means biasing said jaw means toward one another, said cam means being operable by said jaw closer means to permit said spring means to move said jaw means into gripping relation to said component.

5. Apparatus as defined in claim 4 wherein said jaw means are constrained to change angular position with said shaft, and said cam means is rotatable with respect to said shaft and jaw means, whereby said cam may be held stationary and said jaws and shaft rotated to effect movement thereof along said shaft, and said shaft may be held stationary and said cam rotated to effect movement of said jaws along said shaft.

6. In apparatus of the character described comprising a frame supporting a plurality of supply stations, transfer means having jaw members operable to grasp a component at a supply station and to release it at a work station, and a normally disabled feed member at each station;

(a) drive means adapted to move said transfer means through said supply stations and to move all of said feed members, (b) a plurality of selector members each corresponding to a supply station, (c) each selector member being individually and selectively positionable to arrest said transfer means at a corresponding supply station and to enable the feed member thereat, whereby a component is advanced for grasping by the transfer means at the selected station only.

7. Apparatus for trimming wire leads of taped electrical components and severing the tape means between the components, said apparatus comprising:

(a) a frame, (b) a supply station on said frame to which components are led on flexible tape means, (c) shear means adjacent said supply station for severing said tape means, (d) lead cutter means adjacent said shear means and having cutting edges operable in a plane normal to said shear means, (e) feed means for advancing said components through said shear means so as to place said leads between said cutting edges with said tape means in said shear means, (f) drive means for actuating said feed means, shear means, and cutter means in phased relation.

8. Apparatus as defined in claim 7 and wherein said tape means comprises parallel tapes to which oppositely extending leads are attached, and said cutter means comprises a pair of spaced cutter means, each being positioned to cut a wire lead between one of said tapes and the body of said component.

9. Apparatus for trimming wire leads of tape therebetween and delivering the components to a work station, said apparatus comprising:

(a) a frame, (b) a supply station on said frame to which said taped components are led, (c) shear means adjacent said supply station for severing said tape, (d) lead cutter means adjacent said shear means and having cutting edges operable in a plane normal to said shear means, (e) feed means for advancing said components through said shear means so as to place said leads between said cutting edges with said tape in said shear means, (f) component transfer means supported on said frame for movement between said supply station and said work station, (g) and drive means connected to said transfer means, feed means, shear means, and cutter means for actuation thereof in phased relation.

10. Apparatus as defined in claim 9 comprising a plurality of supply stations, shear means, and cutter means, and means for conditioning said drive means to actuate the feed means of only a selected one of said supply stations and to cause said transfer means to be operable between said selected supply station and said work station.

11. Apparatus as defined in claim 10 and wherein said means for conditioning said drive means is responsive to predetermined positional relationships of a workpiece to said work station.

References Cited by the Examiner

UNITED STATES PATENTS

| | | | |
|---|---|---|---|
| 2,854,054 | 9/1958 | Gross | 1—323 X |
| 2,908,909 | 10/1959 | Stolecki et al. | 221—73 X |
| 2,979,726 | 4/1961 | Carlzen et al. | 1—323 |
| 3,057,528 | 10/1962 | Cole et al. | 1—323 X |

WILLIAM W. DYER, JR., *Primary Examiner.*

WILLIAM S. LAWSON, *Examiner.*

F. T. YOST, *Assistant Examiner.*